(12) United States Patent
Malwankar et al.

(10) Patent No.: US 10,645,164 B1
(45) Date of Patent: May 5, 2020

(54) CONSISTENT LATENCY FOR SOLID STATE DRIVES

(71) Applicant: Pavilion Data Systems, Inc., San Jose, CA (US)

(72) Inventors: Kiron Balkrishna Malwankar, Saratoga, CA (US); Karagada Ramarao Kishore, Saratoga, CA (US); Sundar Kanthadai, Fremont, CA (US)

(73) Assignee: Pavilion Data Systems, Inc., San Jose, CA (US)

( * ) Notice: Subject to any disclaimer, the term of this patent is extended or adjusted under 35 U.S.C. 154(b) by 497 days.

(21) Appl. No.: 15/335,328

(22) Filed: Oct. 26, 2016

Related U.S. Application Data

(60) Provisional application No. 62/247,120, filed on Oct. 27, 2015.

(51) Int. Cl.
    *H04L 29/08* (2006.01)
    *G06F 3/06* (2006.01)

(52) U.S. Cl.
    CPC .......... *H04L 67/1097* (2013.01); *G06F 3/067* (2013.01); *G06F 3/0611* (2013.01); *G06F 3/0619* (2013.01); *G06F 3/0653* (2013.01); *G06F 3/0659* (2013.01); *H04L 67/32* (2013.01)

(58) Field of Classification Search
    CPC .... G06F 3/0619; G06F 3/0653; G06F 3/0679; G06F 11/1016; G06F 11/1044; G06F 11/1072; G06F 12/0238; G06F 2212/1032; G06F 2212/152; G06F 2212/202; G06F 2212/214; G06F 2212/7205
    See application file for complete search history.

(56) References Cited

U.S. PATENT DOCUMENTS

| | | | |
|---|---|---|---|
| 9,880,933 B1* | 1/2018 | Gupta | G06F 12/0815 |
| 9,959,059 B2* | 5/2018 | Orme | G06F 12/0238 |
| 2004/0221044 A1* | 11/2004 | Rosenbloom | H04L 29/06 709/227 |
| 2005/0091388 A1* | 4/2005 | Kamboh | H04L 12/2856 709/228 |
| 2007/0233869 A1* | 10/2007 | Jodh | H04L 63/10 709/226 |

(Continued)

OTHER PUBLICATIONS

Nelson, Trent, "winsdk-10/include/10.0.10240.0/shared/devpkey.h", Oct. 15, 2015, Github. (Year: 2015).*

*Primary Examiner* — Dhairya A Patel
*Assistant Examiner* — Eui H Kim
(74) *Attorney, Agent, or Firm* — Lowenstein Sandler LLP

(57) ABSTRACT

A processing device receives a request from a remote computing device to read data from a virtual storage device. The processing device identifies a physical storage device to be accessed to satisfy the request. The processing device then sends a sub-request to the physical storage device to access a portion of the physical storage device. Responsive to determining that the physical storage device has not returned a response to the sub-request within a latency threshold time associated with the physical storage device, the processing device initiates recovery of the portion of the physical storage device to recompute contents of the portion of the physical storage device. The processing device then returns a response to the request from the remote computing device.

18 Claims, 12 Drawing Sheets

(56) References Cited

U.S. PATENT DOCUMENTS

| | | | |
|---|---|---|---|
| 2010/0023814 A1* | 1/2010 | Sundrani | G06F 11/1092 714/55 |
| 2012/0324183 A1* | 12/2012 | Chiruvolu | G06F 11/2038 711/162 |
| 2013/0179747 A1* | 7/2013 | Park | H04L 1/08 714/748 |
| 2013/0297792 A1* | 11/2013 | Kaushik | H04L 63/10 709/225 |
| 2014/0082276 A1* | 3/2014 | Suzuki | G06F 12/0866 711/113 |
| 2014/0317479 A1* | 10/2014 | Candelaria | G06F 11/1004 714/807 |
| 2015/0046668 A1* | 2/2015 | Hyde, II | G06F 3/065 711/162 |
| 2015/0254007 A1* | 9/2015 | Wood | G06F 3/0619 711/114 |
| 2016/0092284 A1* | 3/2016 | Shur | G06F 11/076 714/704 |
| 2016/0099948 A1* | 4/2016 | Ott | G06F 9/54 |
| 2016/0234258 A1* | 8/2016 | Darbha | H04L 67/141 |
| 2017/0013016 A1* | 1/2017 | Wong | H04L 63/20 |
| 2017/0160952 A1* | 6/2017 | Nakanishi | G06F 12/00 |

\* cited by examiner

CONSISTENT LATENCY FOR SOLID STATE DRIVES

RELATED APPLICATIONS

The present application claims the benefit of U.S. Provisional Application No. 62/247,120 filed Oct. 27, 2015, which is incorporated herein by reference.

FIELD OF TECHNOLOGY

This disclosure relates generally to the field of data storage and in particular to providing consistent latency for solid state storage devices.

BACKGROUND

Networked storage arrays may provide an enterprise level solution for secure and reliable data storage. With the introduction of solid state storage devices (e.g., solid state drives (SSDs) such as Flash drives), the speed of such networked storage arrays has improved dramatically. Low latency is an important performance metric for SSDs. Most SSDs have average read latencies that may span a wide range, which can cause problems to applications and hosts that access data on these drives. Thus, latency consistency can be an important metric for applications and hosts accessing data on SSDs.

BRIEF DESCRIPTION OF THE DRAWINGS

The embodiments described herein will be understood more fully from the detailed description given below and from the accompanying drawings.

DETAILED DESCRIPTION

Figure 1:
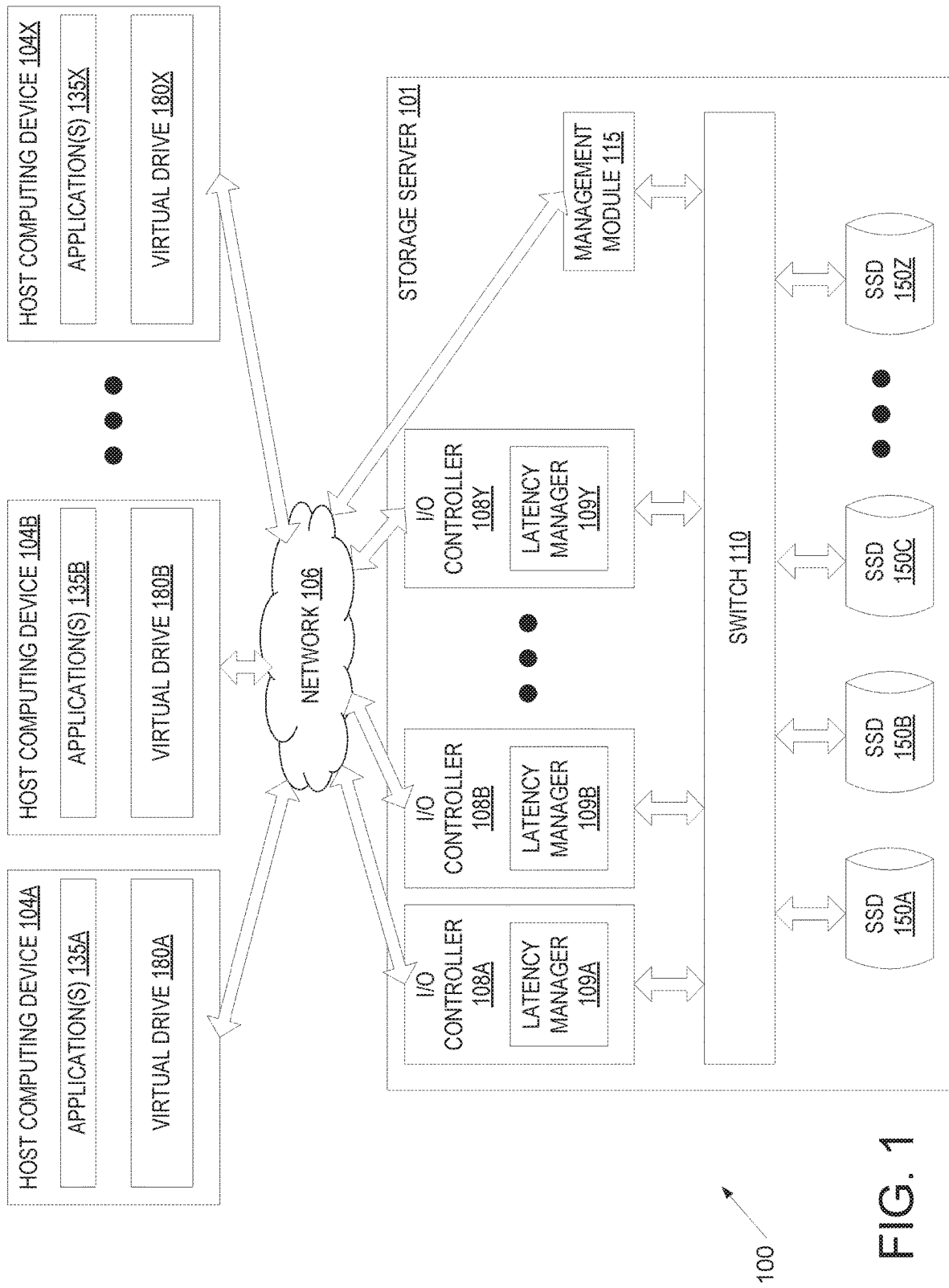
FIG. 1 is a block diagram example of a data center architecture, in which embodiments described herein may operate.

Described herein are systems and methods that enable and implement consistent latency for solid state drives (SSDs). When applications access data from storage arrays, the performance of the applications may rely on receiving the data in a consistent amount of time across multiple requests. In some instances consistent latency can be even more important than attempting to achieve minimum latency. For example, if an SSD's latency varies significantly from one request to another, then hosts that access that SSD may apply a large buffer to accommodate the occasional slow response. However, at most times that large buffer is underutilized. By ensuring consistent latency, the buffer that is used for reads may be reduced. Consistent latency can be important in applications where read or write requests may be divided into sub-requests that are subsequently processed in parallel by different physical drives. These sub-requests may each involve the allocation of a portion of finite system resources (e.g., allocation of data buffers, etc.) that are reserved until each sub-request completes processing. In some implementations, when one sub-request takes a long period of time to complete, other sub-requests in queue behind it may be delayed. This, in turn, may tie up the system resources that may otherwise be used by new sub-requests.

Solid state drives (SSDs) can provide low latency for read sub-requests in many situations. However, repeated writing and re-writing of data to SSDs typically involves occasionally reclaiming blocks that are discarded as a part of the SSD log structure. This process can be known as "garbage collection." Subsequent reads of a block of an SSD while the SSD is performing garbage collection operations on that block may incur an exponentially higher latency (often orders of magnitude higher) than would otherwise be observed by a normal read request. In many cases, a read may be locked out because of garbage collection for a longer period of time than would be required to recompute that block using a recovery process, such as the recovery process associated with a RAID (Redundant Array of Independent Disks) array.

Embodiments described herein provide a latency manager component of a storage server I/O controller that can provide consistent latency for requests sent to solid state drives in a storage array. The latency manager can utilize threshold time values set to be slightly higher than an average read response time but lower than the time required for the garbage collection process to complete. The latency manager can then initiate recovery of data needed to satisfy a pending read request if the threshold value is exceeded. Since the latency incurred due to garbage collection can be orders of magnitude higher than an average read, embodiments described herein can provide that the latency for read requests remains within the threshold time value plus the time needed to complete recovery of the portion of the physical drive.

In embodiments, the I/O controller may receive a request from a remote computing device (e.g., a remote server) to read data from a virtual storage device. The I/O controller may identify a physical storage device to be accessed to satisfy that request, and send a read sub-request to the physical storage device to access a portion of the data on that storage device. The latency manager may determine a latency threshold time associated with the physical storage device. Responsive to determining that the storage device has not returned a response to the read sub-request within the latency threshold time, the latency manager can initiate recovery of the portion (e.g., one or more pages) of the physical storage device needed to satisfy the read-request.

FIG. 1 is a block diagram example of a data center architecture 100, in which embodiments described herein may operate. The data center architecture 100 may include one or more host computing devices (e.g., host computing devices 104A, 104B through 104X) connected to a storage server 101 via a network 106. Network 106 may be a wide area network (WAN) such as the Internet, a local area network (LAN), a storage area network (SAN) or a combination thereof. The host computing devices 104A-X and/or storage server 101 may connect to the network 106 via an Ethernet, Fibre Channel (FC), Fibre channel over Ethernet (FCoE), serial attached small computer system interface (SAS) or serial ATA (SATA) protocol. Alternatively, other protocols may be used to connect to the network 106.

Storage server 101 is a computing device that is configured and optimized to provide storage to remote computing devices (e.g., to host computing devices 104A-X). Storage server 101 may be configured as a storage area network (SAN), network attached storage (NAS), or other remote storage type. Though a single storage server 101 is shown, the host computing devices 104A-X may connect to multiple storage servers. The multiple storage servers may be arranged in a cluster or other configuration.

Storage server 101 includes multiple I/O controllers 108A, 108B through 108Y connected to multiple solid state drives (SSDs) 150A, 150B, 150C through 150Z via a switch 110. The SSDs 150A-Z may be SAS/SATA drives, non-volatile memory express (NVMe) drives, small computer system interface (SCSI) over PCIe (SOP) drives, or solid state drives that communicate using different protocols. The number of SSDs included in storage server 101 may be less than 10 to more than 100. The solid state drives may have the same or different storage capacities. In some implementations, the number of host computing device 104A-X, the number of I/O controllers 108A-Y, and the number of SSDs 150A-Z may be different from each other.

Each I/O controller 108A-Y is a device configured to connect one or more host computing devices 104A-X to one or more SSDs 150A-Z. Each I/O controller 108A-Y includes one or more network interface controllers (NICs) such as Ethernet NICs and/or other protocol adapters (e.g., such as FC, SAS/SATA, or Infiniband (IB) adapters) that connect that I/O controller to network 106. Each I/O controller 108A-Y additionally includes a port that connects to switch 110 via an internal bus. In one embodiment, I/O controllers 108A-Y include peripheral component interconnect express (PCIe) ports that connect to switch 110 via a PCIe bus. Alternatively, or additionally, I/O controllers 108A-Y may include small computer system interface (SCSI) ports, serial attached SCSI (SAS) ports, serial ATA (SATA) ports, Fibre Channel ports, or universal serial bus (USB) ports or other ports for connecting to the switch 110. I/O controllers 108A-Y may additionally include a volatile and/or non-volatile memory to store firmware and/or software for performing operations described herein. Volatile memory may also be used for a data cache or buffer (e.g., as a write cache and/or a read look ahead cache). For example, I/O controllers 108A-Y may include a main memory (e.g., read-only memory (ROM), flash memory, dynamic random access memory (DRAM) such as synchronous DRAM (SDRAM), etc.) and a static memory (e.g., flash memory, static random access memory (SRAM), etc.).

I/O controllers 108A-Y may additionally include a processing device representing one or more general-purpose processors such as a microprocessor, central processing unit, or the like. The term "processing device" is used herein to refer to any combination of one or more integrated circuits and/or packages that include one or more processors (e.g., one or more processor cores). Therefore, the term processing device encompasses a single core central processing unit (CPU), a multi-core CPU and a massively multi-core system that includes many interconnected integrated circuits, each of which may include multiple processor cores. The processing device may therefore include multiple processors. The processing device may include a complex instruction set computing (CISC) microprocessor, reduced instruction set computing (RISC) microprocessor, very long instruction word (VLIW) microprocessor, processor implementing other instruction sets, or processors implementing a combination of instruction sets. The processing device may also be one or more special-purpose processing devices such as an application specific integrated circuit (ASIC), a field programmable gate array (FPGA), a digital signal processor (DSP), network processor, or the like. In one embodiment, each I/O controller 108A-Y is a system on a chip (SoC) including a processing device, a memory, one or more NICs and one or more internal ports.

Each I/O controller 108A-Y is assigned to one or more host computing devices 104A-X, and handles input/output (I/O) commands for those host computing devices. Applications 135A-X running on a host computing device 104A-X may attempt to read data from and/or write data to a virtual drive 180A-X that the host computing device 104A-X has access to. Responsive to such a read or write request, a remote driver running on the host computing device 104A-X (not pictured) encapsulates a read or write request into a message (e.g., into an Ethernet packet) and sends the message to the I/O controller 108A-X that is assigned to that host computing device 104A-X.

When the I/O controller 108A-Y receives the read or write request from the host computing device 104A-X, the I/O controller 108A-Y extracts the read or write request from the message and deconstructs the request by determining the logical addresses of the virtual drive 180A-X that should be used to write the data to or read the data from. The I/O controller 108A-Y may additionally translate the logical addresses of the virtual drive to physical addresses of the SSDs 150A-Z. For example, if a read command was received, the I/O controller 108A-Y may determine which SSDs 150A-Z store the information to be read as well as which physical addresses on those SSDs the data should be read from.

The I/O controller 108A-Y may then generate one or more sub-requests directed to the determined SSDs 150A-Z to read data from those SSDs 150A-Z. The I/O controller 108A-Y may additionally allocate buffer space for each sub-request in a memory of the I/O controller 108A-Y. Once all sub-requests associated with the read command have been received from the applicable SSDs 150A-Z, I/O controller 108A-Y may then combine the data of each of the sub-requests that was stored in the buffer space and return the combined data as a response to the read command received from host computing device 104A-X.

I/O controllers 108A-Y may additionally include array configuration information for the SSDs 150A-Z that may be used to reconstruct data of one or more virtual drives 180A-X if one or more of the SSDs 150A-Z becomes unavailable. The SSDs 150A-Z may become unavailable due to a drive failure, performance degradation due to storage reclamation processing (e.g., garbage collection), or the like. If a read command is received while one or more SSDs 150A-Z are unavailable, an I/O controller may retrieve data from the available SSDs and then reconstruct missing data that is stored by the unavailable SSD (or unavailable SSDs) from the retrieved data. I/O controller 108A-Y may reconstruct the missing data by executing a formula to recompute the missing data using standard recovery algorithms (e.g., Reed-Solomon). I/O controller 108A-Y may then satisfy the read command using the reconstructed data.

Each I/O controller 108A-Y may include a latency manager 109A-Y that manages the pending read sub-requests to achieve consistent latency for responses to read requests from hosts. For each sub-request, latency manager 109A-Y may determine a latency threshold time associated with the SSD 150A-Z to which the sub-request may be sent. If the SSD 150A-Z does not return a response to the sub-request within the determined latency threshold time, latency manager 109A-Y may initiate the recovery process noted above to recompute the data of the applicable portion of the SSD. The recovery for the portion of data may be performed even though the SSD may not have failed.

In some implementations, the latency threshold time can be determined based on the average expected time for an SSD to return a response to a read sub-request. The latency threshold time may be determined empirically by measuring the average expected time for the destination SSDs 150A-Z (as well as other SSDs from the same manufacturer, of the same capacity, of similar physical characteristics, etc.) to return a response to a read sub-request, and factoring in an additional amount of time to account for observed outlier sub-requests that may return a response in an amount of time that is greater than the average. The latency threshold time may be determined by a benchmarking component (not pictured) of storage server 101 and stored in a configuration data store accessible to latency manager 109A-Y. Alternatively, latency manager 109A-Y may monitor storage usage of the SSDs 150A-Z and compute the latency threshold time based on the observed usage of the SSDs 150A-Z.

In some implementations, the latency threshold can be determined based in part on the average expected time for an SSD to complete a write operation. Since write operations can take longer than read operations for some SSDs, a latency threshold based only on read operations can result in additional threshold violations (e.g., where a write is initiated on a page in a block and a read is subsequently requested on another page in that block while the write is being performed). In these cases, the latency threshold time may be determined by measuring the average expected time for the SSD to complete a write operation for a write sub-request combining it with the average expected time for the SSD to return a response to a read sub-request.

In some implementations, latency manager 109A-Y may start a timer set to the latency threshold time and determine that the SSD 150A-Z has not returned a response within the latency threshold time by detecting an expiration of the timer. Latency manager 109A-Y may determine latency threshold times for each SSD 150A-Z that is to be accessed to satisfy the read command received from the host computing device 104A-X. Thus, in instances where a read command results in three read sub-requests to three different SSDs 150A-Z, three threshold values may be determined and three timers initiated (one for each sub-request). If expiration of any of the timers is detected, latency manager 109A-Y may initiate recovery of the portion of the SSD 150A-Z associated with the respective sub-request that timed out.

Switch 110 is a multi-port bridge that connects I/O controllers 108A-Y to SSDs 150A-Z. Switch 110 manages the flow of data within storage server 101 by connecting specific I/O controllers 108A-Y to specific SSDs 150A-Z on a message by message basis, allowing the switch 110 to regulate the flow of traffic. Each I/O controller 108A-Y and each SSD 150A-Z connected to switch 110 can be identified using a unique address (e.g., a unique port address) of the I/O controller or SSD. Switch 110 may be a PCIe switch, an Ethernet switch, a SAS or SATA expander, a USB switch, or other type of switch.

Each solid state drive (SSD) 150A-Z (also referred to as a solid state storage device) is a non-volatile storage device that uses integrated circuits to persistently store data. SSDs 150A-Z have numerous advantages over traditional disk drives. As compared to disk drives, SSDs are more resilient, consume less power, and have lower latency (access times). In one embodiment, SSDs 150A-Z are NAND-based Flash memory devices or NOR-based Flash memory devices. Flash memory devices are non-volatile and can be electronically erased and reprogrammed. Alternatively, one or more SSDs 150A-Z may be volatile memory-based solid state drives (e.g., dynamic random access memory (DRAM)-based SSDs) that have a battery backup. SSDs 150A-Z may include one or more ports (e.g., PCIe ports) to connect to switch 110. SSDs 150A-Z may connect to switch 110 via PCIe, SCSI, SAS, USB, or other connection protocols.

Each SSD 150A-Z has a controller and a storage area that includes memory (e.g., NAND Flash non-volatile memory) to store data. The storage area is divided into memory pages, which is the smallest unit of storage to which data may be stored. Memory pages may have sizes based on a configuration of an SSD. For example, SSDs 150A-Z may have memory pages that are 8 kilobytes (kB) or 16 kB. However, other memory page sizes are also possible. Memory pages are grouped into blocks. Each block contains a particular number of memory pages, which is again dependent on a design of a particular SSD. Typical SSDs have blocks that include 256 memory pages. Notably, conventionally an SSD may only perform a write or a read to a single memory page in a block at a time.

Storage server 101 additionally includes a management module 115. Management module 115 may be a device configured to perform particular operations with regards to management of the array of SSDs 150A-Z. Management module 115 may include a processing device, a port for connecting to switch 110 and a NIC for connecting to network 106. Management module 115 may additionally include a volatile and/or non-volatile memory to store firmware and/or software for performing operations described herein. In one embodiment, management module 115 is a SoC.

The management module 115 determines how to configure the array of SSDs 150A-Z and further determines configurations for the one or more virtual drives 180A-X. For example, management module 115 may determine which virtual drives map to which physical SSDs and which portions of those SSDs the virtual drives map to. Once these configurations are determined, management module 115 may send these configurations to the I/O controllers 108A-Y for implementation. Management module 115 additionally performs discovery operations and may be responsible for paring I/O controllers 108A-Y with host computing devices 104A-X. Discovery operations may be initiated when storage server 101 powers on and/or to connect host computing devices to new or updated virtual drives. In one embodiment, management module 115 includes a latency manager 109A-Y. The latency manager of the management module 115 may be responsible for determining latency threshold times to use for SSDs.

Host computing devices 104A-X may each include a physical machine and/or a virtual machine hosted by a physical machine. The physical machine may be a rackmount server, a desktop computer, or other computing device. In one embodiment, one or more host computing device 104A-X includes a virtual machine managed and provided by a cloud provider system. Each virtual machine offered by a cloud service provider may be hosted on a physical machine configured as part of a cloud. Such physical machines are often located in a data center. The cloud provider system and cloud may be provided as an infrastructure as a service (IaaS) layer. One example of such a cloud is Amazon's® Elastic Compute Cloud (EC2®).

Each host computing device 104A-X may host one or more applications 135A, 135B through 135X. The applications 135A-X may be application servers, web servers, standalone applications, and so forth. Accordingly, host computing devices 104A-X may provide services to clients via applications 135A-X in some embodiments.

Each host computing device 104A-X may additionally mount or otherwise connect to one or more virtual drives 180A, 180B through 180X (e.g., one or more logical unit numbers (LUNs) and/or one or more virtual NVMe drives). Though each host computing device 104A-X is shown to mount a different virtual drive 180A-X, different host computing devices may mount or connect to the same virtual drive. Each virtual drive 180A-X is a logical storage device that maps a logical storage address space to physical storage address spaces of multiple storage devices (e.g., solid state drives (SSDs) 150A, 150B, 150C through 150Z of storage server 101). Additionally, a virtual drive 180A-X ray reap a logical storage address space to physical storage address spaces of storage devices on multiple different storage servers.

Figure 2A:
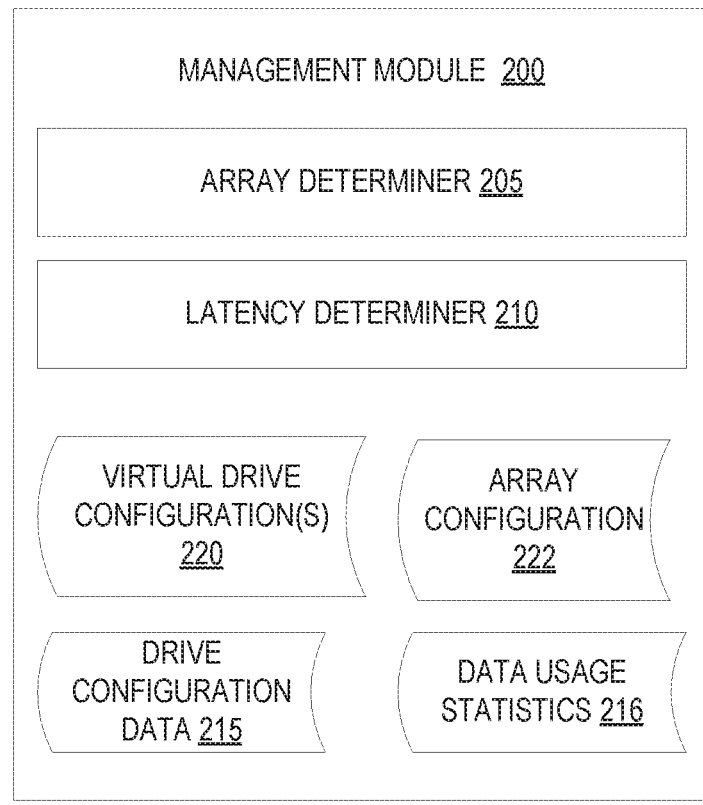
FIG. 2A is a block diagram of one embodiment of an array manager.

FIG. 2A is a block diagram of one embodiment of a management module 200 showing logical modules that may be loaded into and executed by a processing device of management module 200. Alternatively, management module 200 may include one or more physical modules (e.g., an integrated circuit (IC) designed with described modules or a configurable logic such as a field programmable gate array (FPGA) configured to have the modules). In one embodiment, management module 200 includes the modules of an array determiner 205 and a latency determiner 210. Alternatively, the functionality of the array determiner 205 and/or latency determiner 210 may be divided into additional modules or may be combined into a single module. In one embodiment, management module 200 corresponds to management module 115 of FIG. 1.

Array determiner 205 identifies available storage devices and may determine how those storage devices are to be configured into an array, and may store such information as array configuration 222. Array determiner 205 additionally determines how to divide the array of storage devices into virtual drives, and this information may be included in virtual drive configuration(s) 220. Array determiner 205 may determine how many virtual drives to create, the sizes of those virtual drives, and what physical addresses of the storage devices to allocate to each virtual drive. Once the configurations for the virtual drives are determined, array determiner 205 sends the virtual drive configurations 220 to I/O controllers. The I/O controllers may then use the received virtual drive configurations 220 to establish and maintain the virtual drives.

Latency determiner 210 may be responsible for determining latency threshold times to use for the SSDs on the storage server. Latency determiner 210 may receive information from I/O controllers on the storage server to determine latency threshold times for the SSDs associated with the I/O controllers. In one embodiment, latency determiner 210 may store the received information in data usage statistics 216. Latency determiner may identify the manufacturer identifier of each SSD (e.g., a device identifier), the capacity of the drive, or other similar device characteristics. This information may be identified by sending a message to the drive and receiving a response. Alternatively, this information may be identified when the SSD is added to the storage server. In one embodiment, this information is stored in drive configuration data 215.

Latency determiner 210 may use drive configuration data 215 and data usage statistics 216 to calculate average observed latency times for reads processed by SSDs associated I/O controllers. Additionally or alternatively, latency determiner 210 may calculate average latency times across all SSDs on the storage server, all SSDs from a particular manufacturer, all SSDs with the same capacity, or the like. In some embodiments, latency determiner 210 may communicate through a network interface to a component in a cloud computing environment that can receive information for particular physical storage devices from device manufacturers or external benchmarking utility providers to determine latency threshold times. Latency determiner 210 may then send latency threshold times to individual I/O controllers for use in managing read requests for individual SSDs.

Figure 2B:
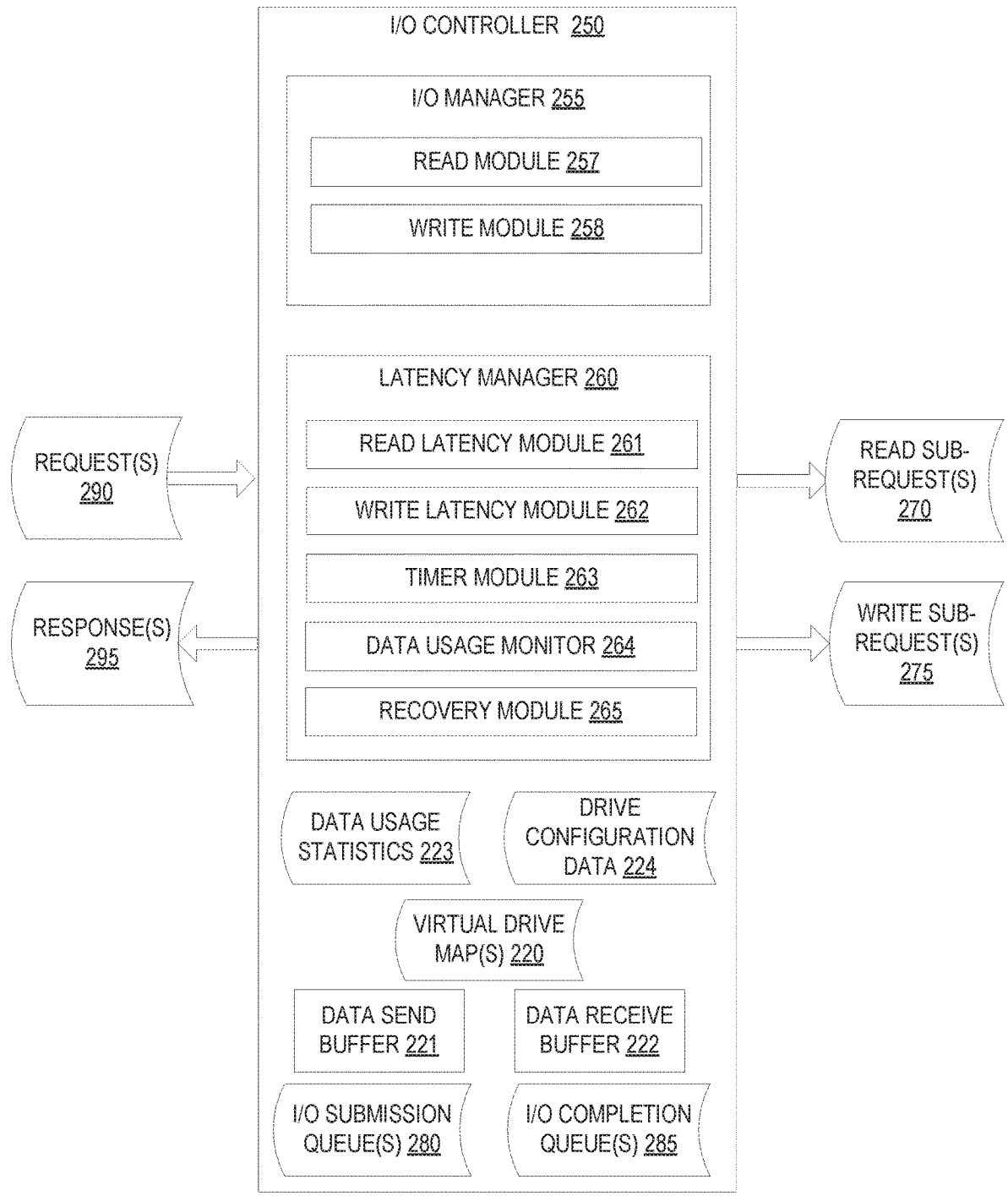
FIG. 2B is a block diagram of one embodiment of an I/O controller.

FIG. 2B is a block diagram of one embodiment of an I/O controller 250 showing logical modules that may be loaded into and executed by a processing device of I/O controller 250. Alternatively, I/O controller 250 may include one or more physical modules (e.g., an integrated circuit (IC) designed with described modules or a configurable logic such as a field programmable gate array (FPGA) configured to have the modules). In one embodiment, I/O controller 250 corresponds to an I/O controller 108A-Y of FIG. 1.

In one embodiment, I/O controller 250 includes the module of an input/output (I/O) manager 255. The I/O manager 255 in one embodiment includes a read module 257 and a write module 258. Alternatively, the read module 257 and/or write module 258 may be distinct modules that are separate from I/O manager 255.

I/O manager 255 is responsible for communicating with host computing devices and satisfying input/output (I/O) commands such as read commands and write commands from the host computing devices. I/O Controller 250 receives requests 290 from host computing devices. The messages may be, for example, Ethernet packets. The received requests 290 may contain I/O commands encapsulated in the messages and/or data encapsulated in the requests 290. Responsive to receipt of a message from a host, I/O manager 255 may remove an I/O command and/or data from the message and determine which module 257-258 should handle the data or I/O command.

In one embodiment, each of the requests 290 is an Ethernet packet having a particular format and encapsulating an I/O command such as a read command or a write command. The Ethernet packet may include a transport header identifying a destination address (e.g., a destination MAC address), a source address (e.g., a source MAC address), and a virtual local area network (VLAN) tag (if appropriate). A command payload in the I/O command may include specific command instructions, such as specific read or write instructions. The specific command instructions may be NVMe command instructions (e.g., NVMe read commands or NVMe write commands), or may include other read or write commands. A data payload in the I/O command may include data to be written to storage or data that has been retrieved from storage.

In one embodiment, I/O manager 255 validates the I/O command by determining whether a host that generated the I/O command has access to a virtual drive indicated in the I/O command and/or to logical block addresses (LBAs) indicated in the I/O command. If the I/O command is not successfully validated, then it may be discarded.

Responsive to receipt of a read command, I/O manager 255 invokes read module 257. Read module 257 is responsible for responding to read commands. In one embodiment, the command payload of the read command identifies specific logical block addresses of a virtual drive (e.g., a virtual NVMe drive) from which data is to be read. For example, the command payload may identify a particular logical block address and a length. Read module 257 may use a virtual drive map 220 for the virtual drive to determine what locations (e.g., what memory pages) on the SSDs (e.g., physical NVMe drives) correspond to the logical block addresses of the virtual drive.

Read module 257 may then generate read sub-requests 270 for each of the storage devices storing data to be read. For example, if a virtual drive maps to three physical drives, read module 257 may determine first memory pages on a first drive storing requested information, second memory pages on a second drive storing requested information and third memory pages on a third drive storing requested information. Read module 257 may then generate a first read sub-request directed to the first memory pages of the first drive, a second read sub-request directed to the second memory pages of the second drive, and a third read sub-request directed to the third memory pages of the third drive. The read sub-requests may be placed into I/O submission queues 280 for each of the drives that are managed by the I/O manager. Once a read sub-request reaches the front of an I/O submission queue 280, read module 257 may then send the generated read sub-request to the appropriate drive.

The drives receive the read sub-requests and return data stored at indicated memory locations. The returned data is added to a data send buffer 221 by read module 257 until the data send buffer 221 fills or all requested data has been received. In one embodiment, the data send buffer 221 has a size that corresponds approximately to a maximum allowed size of an Ethernet packet. Once the data send buffer 221 fills, read module 257 may generate a response message 295 (e.g., a new Ethernet packet having the above identified format). Read module 257 may then encapsulate the data from the data send buffer 221 into the response 295. For example, read module 257 may generate an Ethernet packet with a transport header indicating the MAC addresses of the requesting host device and of the I/O controller 250. The Ethernet packet may also include in its payload a protocol header identifying a Data-In I/O command, may include a command payload for the Data-In I/O command and/or may include a data payload with the data from the data send buffer 221. Read module 257 may then send the response 295 to the host.

Read module 257 may continue to create and send responses incorporating retrieved data as the data send buffer 221 fills. Once all of the data has been retrieved, a final response 295 may include in its protocol header a command ID for a completion notification. The completion notification may notify the host that all data has been retrieved and that the requested read command has been satisfied. Additionally, as specific read sub-requests sent to the drives are satisfied by the drives, read module 257 may place those read sub-requests into an I/O completion queue 285. These read sub-requests may be cleared from the I/O completion queue once the retrieved data has been sent to the host.

In one embodiment, responsive to receipt of a write command, I/O manager 255 invokes write module 258. Write module 258 is responsible for responding to write commands. In one embodiment, the command payload of the write command identifies a length of data to be written. Write module 258 may determine what logical block addresses to write the data to, and may use the virtual drive map 220 for the virtual drive to determine what locations (e.g., what memory pages) on the physical storage devices (e.g., physical NVMe drives) correspond to the logical block addresses of the virtual drive. Alternatively, the logical block addresses (e.g., a starting logical block address and length) may be indicated in the write command.

Following the request (e.g., Ethernet packet) encapsulating the write command, I/O controller 250 may receive additional requests identifying the particular write command and encapsulating data to be written that is associated with the write command. Since Ethernet packets have a dictated maximum size, the data to be written may be broken up into portions, where each portion can be encapsulated within a separate Ethernet packet. I/O manager 255 removes the data from each such request (e.g., from each Ethernet packet) and provides the data to write module 258. Write module 258 may add the received data extracted from the Ethernet packets (or other messages) into a data receive buffer 222.

Write module 258 may then generate write sub-requests 275 for each of the storage devices to which the data will be written. For example, if a virtual drive maps to three physical drives, write module 258 may determine that a first data portion is to be written to first memory pages on a first drive, a second data portion is to be written to second memory pages on a second drive, and a third data portion is to be written to third memory pages on a third NVMe drive. Write module 258 may then generate a first write sub-request to write the first data portion to the first memory pages of the first drive, a second write sub-request to write the second data portion to the second memory pages of the second drive, and a third write sub-request to write the third data portion to the third memory pages of the third drive. The write sub-request may be placed into I/O submission queues 280 for each of the drives that are managed by the I/O manager. Once a write sub-request reaches the front of an I/O submission queue 280, write module 258 may then send the generated write sub-request to the appropriate drive.

The drives receive the write sub-requests and write the data portions to the specified locations. The drives then return a completion notification. These completion notifications may be added to the I/O completion queue 285. Once completion notifications have been received from each of the drives to which data was written (and in some embodiments these completion notifications reach a front of the I/O completion queue), write module 258 may generate a response 295 (e.g., a new Ethernet packet having the above identified format). Write module 258 may then encapsulate the completion notification into the response 295. For example, write module 258 may generate an Ethernet packet with a transport header indicating the MAC addresses of the requesting host device and of the I/O controller 250. The Ethernet packet may also include in its payload a protocol header identifying a completion notification I/O command (also referred to as a response I/O command) and may include a command payload for the completion notification that identifies the specific I/O command that has completed. Write module 258 may then send the response 295 to the host.

I/O controller 250 may additionally include latency manager 260 that can provide consistent latency in responding to read requests from hosts (and for sub-requests sent to the storage devices). In some implementations, latency manager 260 may include a read latency module 261, a write latency module 262, a timer module 263, a data usage monitor 264, and a recovery module 265. Alternatively, the read latency module 261, write latency module 262, timer module 263, data usage monitor 264, and recovery module 265 may be distinct modules that are separate from latency manager 260. In one embodiment, latency manager 260 corresponds to a latency manager 109A-Y of FIG. 1.

Once the read module 257 generates the read sub-request 270, latency manager 260 may be invoked to determine a latency threshold time associated with the physical storage device to be accessed to satisfy the request. If the physical storage device does not return a response to the sub-request within the determined latency threshold time, latency manager 260 may provide consistent latency for the sub-request by initiating recovery of a portion of the physical storage device to recompute the data needed to satisfy the read sub-request. In some implementations, latency manager 260 may determine the latency threshold time based in part on the average expected time for the physical storage device to return a response to a read-request, the average expected time for the physical storage device to complete a write operation, or a combination of the two.

In one embodiment, read latency module 261 may be invoked to determine a read response time value associated with the physical storage device. The read response time value may be an average expected time for that physical storage device to return a response to a read sub-request. Read latency module 261 may be implemented as a lookup agent that determines the read response time value by performing a lookup of latency information that is stored based on characteristics of the physical drive. For example, read latency module 261 may identify the manufacturer identifier of the physical drive (e.g., a device identifier), the capacity of the drive, or other similar device characteristics. This information may be identified by sending a message to the drive and receiving a response. Alternatively, this information may be identified when read module 257 determines the physical drive for the read sub-request. In one embodiment, this information is stored in drive configuration data 224. Read latency module 261 may access drive configuration data 224 to determine the read response time value associated with the physical drive. As noted above, the read response time value may be initially set using a benchmarking component of the storage server that can be stored in the drive configuration data 224. Alternatively, the benchmarking may be performed by an external device, and results of the benchmarking may be stored in the drive configuration data 224.

In one embodiment, read latency module 261 may be implemented as a learning agent that determines the read response time value for each sub-request by monitoring the data usage of the physical drives on the storage server. In some implementations, read latency module 261 may access a data store collected data usage statistics for the physical drive (e.g., data usage statistics 223) and determine the read response time value using the statistics by computing an average of the actual read response times for other read sub-requests processed by the applicable physical drive. Read latency module 261 may then set the average expected time for the physical storage device to return the response to the read sub-request using the computed average.

Latency manager 260 may include a data usage monitor 264 to collect and store data usage statistics 223. Data usage monitor 264 may identify the physical drives on the storage server (e.g., the manufacturer identifier (ID), device type, device capacity, etc.). Data usage monitor 264 may then monitor the response times of read sub-requests sent to the physical drives and store the information for use by read latency module 261 and write latency module 262 in determining average response times and latency threshold values. In some implementations, data usage monitor 264 may be a component of the I/O controller 250 and collect information for the physical storage devices on the storage server.

Latency manager 260 may then set the latency threshold time to a value that accounts for the average read response time value and factors in an additional amount of time to accommodate observed outlier sub-request responses for the storage device that were completed in an amount of time that is greater than the average. For example, an average read response time value for read sub-requests serviced by a particular physical drive may be measured at 50 microseconds, and a majority of the read response outliers for that physical drive may be returned within 100 microseconds. However, some read response outliers may be on the order of 5-10 milliseconds due to those read requests being issued to a block that is undergoing garbage collection and erase operations. Accordingly, the latency threshold time may be set to a value of 100 microseconds to account for some outliers while still providing a consistent level of overall latency for read sub-requests.

In some implementations, observed outlier read sub-request response times may be a result of a read that is waiting for a write to complete for the same block. As noted above, conventionally an SSD may only perform a write or a read to a single memory page in a block at a time. Since a write operation can take far longer than a read operation, outlier read requests that result from waiting for write operations to complete could result in a higher threshold time (e.g., a threshold time of 650-2200 microseconds in some embodiments). When determining the latency threshold time, latency manager 260 may adjust the additional amount of time to add to the read response time value to account for read outliers waiting for writes to complete. In some embodiments latency manager 260 may access data usage statistics 223 for observed response time information for reads that wait for writes. Alternatively, latency manager 260 may access drive configuration data 224 to determine the average response time for write operations associated with the particular drive. Latency manager 260 may then adjust the added value down to account for those outlier read requests that are the result of waiting for a write to complete for the same block of the drive.

In some embodiments, latency manager 260 may set the latency threshold based in part on the average expected time for a physical drive to complete a write operation. In an illustrative example, latency manager 260 may set the threshold in this manner when the recompute time for a portion of a physical storage device is greater than the maximum combined time expected to complete a read operation and write operation (e.g., the "worst case" write time and read time). Write latency module 262 may be invoked to determine a write response time value associated with the physical storage device. The write response time value may be an average expected time for that physical storage device to complete a write operation for a write sub-request. As with read latency module 261, write latency module 262 may be implemented as a lookup agent to determine the write response using configuration information stored in a mapping table or configuration file (e.g., drive configuration data 224) associated with the applicable physical drive.

Latency manager 260 may then set the latency threshold time to a value that accounts for the read response time value and/or the write response time value. For example, if the measured read response time value for read sub-requests serviced by a particular physical drive is measured at 50 microseconds, and the write response time value for that physical drive is measured at 600 microseconds, the latency threshold may be set to a value of 650 microseconds to account for the average latency incurred by a read sub-request as a result of a pending write sub-request.

As noted above, once read module 257 sends a read sub-request to a physical storage device, if the physical storage device does not return a response to the sub-request within the determined latency threshold time, latency manager 260 may initiate recovery of a portion of the physical storage device to recompute the data needed to satisfy the read sub-request. In some implementations, latency manager 260 may determine that the physical storage device has not returned a response to the sub-request within the latency threshold time by detecting expiration of a timer associated with the sub-request. In one embodiment, when read module 257 sends the read sub-request, latency manager 260 may invoke timer module 263 to set a timer value to the latency threshold time and subsequently start the timer. If the physical storage device has not returned a response to the read sub-request before expiration of the timer, timer module 263 can send a notification to latency manager 260 to initiate recovery of a portion of the physical storage device needed to satisfy the read sub-request to recompute the contents of that portion.

In some implementations, a single request 290 received from a remote host may result in multiple sub-requests. Read module 257 may identify the additional physical storage devices to be accessed to satisfy the request from the remote host, determine additional latency threshold times associated with each of the additional physical storage devices, send a read sub-request to each of the additional physical storage devices to access the applicable data from the corresponding storage device, and start an additional timer for each of the additional sub-requests. Responsive to detecting expiration of one of the additional timers, latency manager 260 may initiate recovery of the applicable portion of the corresponding physical drive. For example, if three sub-requests are sent to three different physical drives, latency manager 260 may determine three different latency threshold times (one for each of the three drives) and start three different timers (one for each sub-request set to the corresponding threshold time). If the second timer expires before the second drive returns a response to the second sub-request, latency manager 260 may initiate recovery for the needed portion of the second drive to satisfy the second sub-request.

Responsive to determining that a physical storage device has not returned a response to a read sub-request within the determined latency threshold time associated with the physical storage device, latency manager 260 may invoke recovery module 265 to recompute the contents of the needed portion of the physical storage device to satisfy the sub-request. Recovery module 265 may reconstruct the needed data by executing a formula to recompute the data using standard recovery algorithms (e.g., Reed-Solomon). In an illustrative example, recovery module 265 may determine the logical block address of the physical drive (e.g., the physical LBA) associated with the pending read sub-request.

Recovery module 265 may then determine logical block addresses containing data on multiple other physical drives that can be used to reconstruct the data of the logical block address, and may perform reads on those additional logical block addresses to retrieve parity data and/or associated data. Recovery module 265 may then execute a recovery formula to recompute the data for the portion of the physical drive needed to satisfy the sub-request using the other retrieved data. Once the data has been recomputed, recovery module 265 may then add the recovered data to data receive buffer 222 so that it may be used when constructing response 295 for return to the host computing device.

In some implementations recovery module 265 may additionally monitor the elapsed time to complete the recovery and store it in data usage statistics 223 for use in optimizing the latency threshold time for future sub-requests. The elapsed time to complete the recovery can include the elapsed time to read the other physical drives that contain the data required to recover the needed data as well as the time needed to recompute the needed data by combining the data read from each of the other physical drives. Once recovery has been initiated, recovery module 265 may take any one of several measures to handle the pending sub-request. In one embodiment, recovery module 265 may cancel the original sub-request immediately upon initiating recovery (e.g., by sending a notification to the physical storage device to cancel the request. Alternatively, the original sub-request may not be canceled). In some embodiments, recovery module 265 may initiate recovery while the sub-request remains pending, which could result in the sub-request returning a response while recovery is in progress.

Responsive to determining that the physical storage device has returned the response to the sub-request after recovery has been initiated (but has not yet completed), recovery module 265 may store the data from the returned response to the sub-request in a response buffer (e.g., data send buffer 221) to be used to return the response to the host computing device. Recovery module 265 may then terminate the recovery of the applicable portion of the physical storage device, retaining the actual data from the physical drive rather than waiting for the recomputed data. In an alternative embodiment, recovery module 265 may delete the data from the returned response in favor of the recomputed data rather than terminating the recovery process.

If recovery module 265 does not terminate the sub-request, the sub-request may complete successfully and return a response after the recovery has completed. In one embodiment, responsive to determining that the physical storage device has returned a response to a sub-request after recovery of the portion of the physical storage device has been completed, recovery module 265 may delete the data from the returned response to the sub-request and retain the recovered data. Alternatively, recovery module 265 may simply elect to avoid storing the data from the returned response to the response buffer, leaving the recomputed data unaltered.

In some implementations, recovery module 265 may compare the contents of the returned response to the sub-request against the contents of the recomputed data to determine which data set to retain. Recovery module 265 may first compare the data from the returned response to the sub-request to the recomputed contents of the portion of the physical storage device to determine whether the returned data matches the recomputed contents of the portion of the physical storage device. In one embodiment, responsive to determining that the returned data does not match the recomputed contents, recovery module 265 may elect to retain the returned data, storing the returned data in the response buffer (e.g., data send buffer 221) to be used to return the response to the request from the host computing device (e.g., overwriting the recomputed data already in the buffer with the returned data). Recovery module 265 may store information associated with the mismatch in data usage statistics 223 for use in optimizing the latency threshold time for future sub-requests. Recovery module 265 may also send a notification of the mismatch (e.g., to another component of the I/O controller, to a management console, etc.). Additionally or alternatively, responsive to determining that the returned data does match the recomputed contents, recovery module 265 may elect to retain the recomputed data, deleting the data from the returned response (e.g., leaving the recomputed data already in the response buffer unaltered).

When each of the pending sub-requests associated with a received request 290 has completed via either receipt of a successful response or via successful recovery, I/O controller 250 may combine the data in data send buffer 221 for the sub-requests and return response 295 to the host computing device.

FIGS. 3-9 are flow diagrams of various implementations of methods related to providing consistent latency for SSDs. The methods are performed by processing logic that may include hardware (circuitry, dedicated logic, etc.), software (such as is run on a general purpose computer system or a dedicated machine), or a combination of both. Some methods may be performed by a latency manager such as latency managers 109A-Y of FIG. 1, or latency manager 260 of FIG. 2B. Some methods may be performed by an I/O controller such as any I/O controller 108A-Y of FIG. 1, or I/O controller 250 of FIG. 2B.

For simplicity of explanation, the methods are depicted and described as a series of acts. However, acts in accordance with this disclosure can occur in various orders and/or concurrently, and with other acts not presented and described herein. Furthermore, not all illustrated acts may be required to implement the methods in accordance with the disclosed subject matter. In addition, those skilled in the art will understand and appreciate that the methods could alternatively be represented as a series of interrelated states via a state diagram or events.

Figure 3:
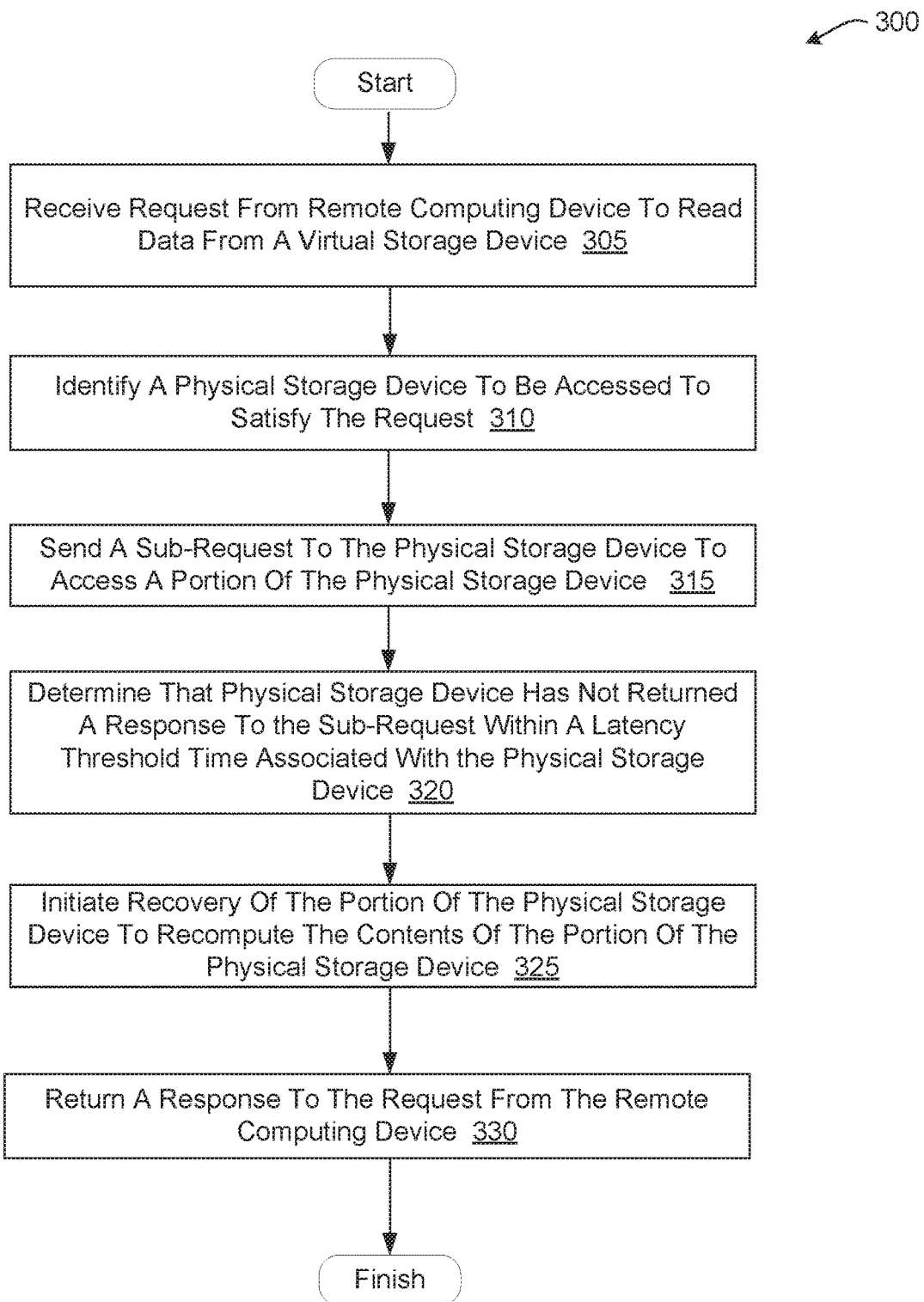
FIG. 3 is a flow diagram of one embodiment for a method of providing consistent latency for Solid State Drives.

FIG. 3 is a flow diagram of one embodiment for a method 300 of providing consistent latency for Solid State Drives. Method 300 may be performed, for example, by a latency manager of an I/O controller. At block 305 of method 300, processing logic receives a request from a remote computing device to read data from a virtual storage device (e.g., from a virtual drive mounted on the host).

At block 310, processing logic identifies a physical storage device to be accessed to satisfy the request received at block 305. At block 315, processing logic sends a sub-request to the physical storage device to access a portion of the physical storage device. At block 320, processing logic determines that the physical storage device has not returned a response to the sub-request within a latency threshold time associated with the physical storage device. At block 325, processing logic initiates recovery of the portion of the physical storage device to recompute the contents of the portion of the physical storage device. At block 330, processing logic returns a response to the request from the remote computing device received at block 305. After block 330, the method of FIG. 3 terminates.

Figure 4:
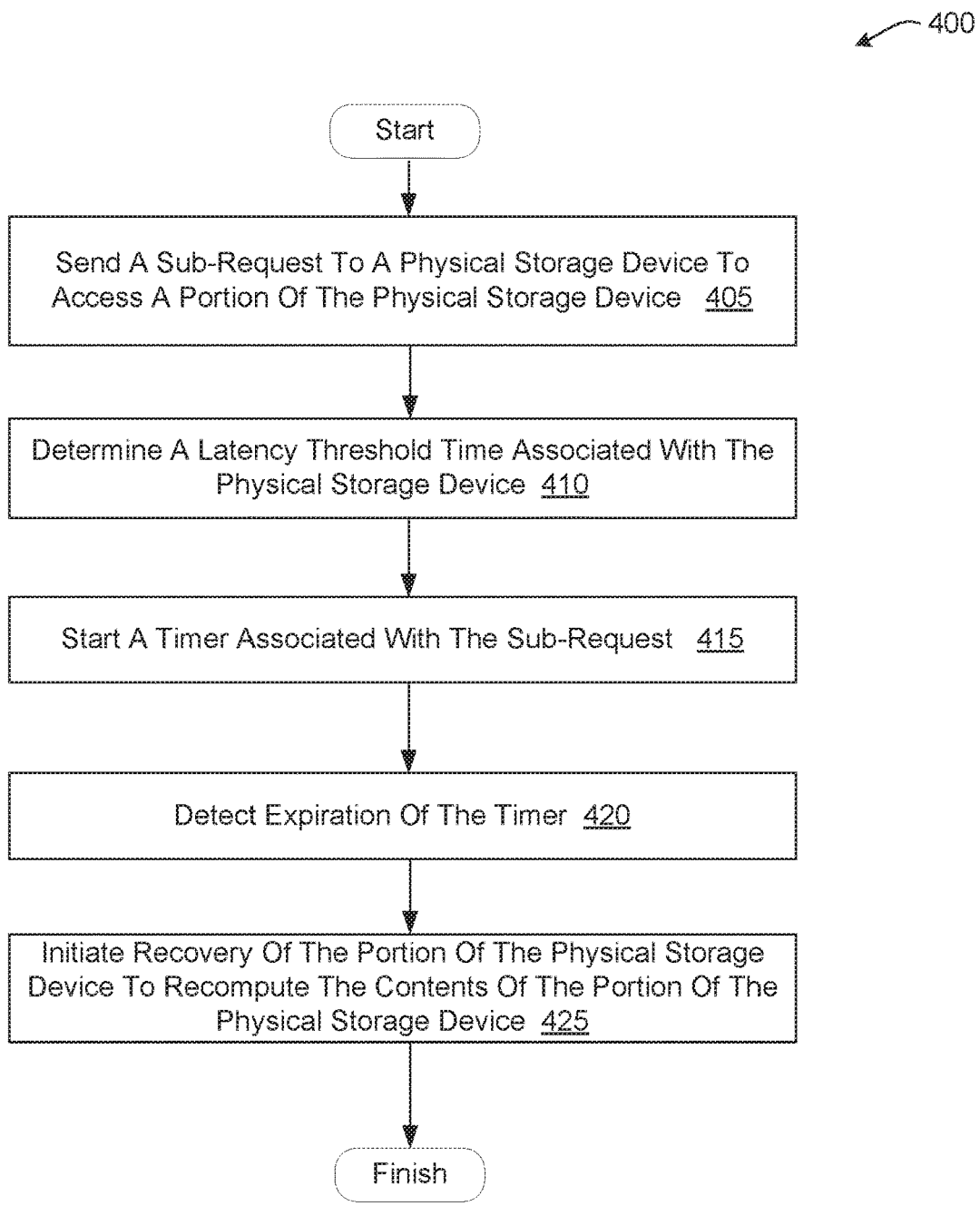
FIG. 4 is a flow diagram of one embodiment for a method of determining that a physical storage device has not returned a response within a latency threshold time.

FIG. 4 is a flow diagram of one embodiment for a method 400 of determining that a physical storage device has not returned a response within a latency threshold time. Method 400 may be performed, for example, by a latency manager of an I/O controller. At block 405 of method 400, processing logic sends a sub-request to a physical storage device to access a portion of the physical storage device. At block 410, processing logic determines a latency threshold time associated with the physical storage device. At block 415, processing logic starts a timer associated with the sub-request. At block 420, processing logic detects expiration of the timer. At block 425, processing logic initiates recovery of the portion of the physical storage device to recompute the contents of that portion of the physical storage device. After block 425, the method of FIG. 4 terminates.

Figure 5:
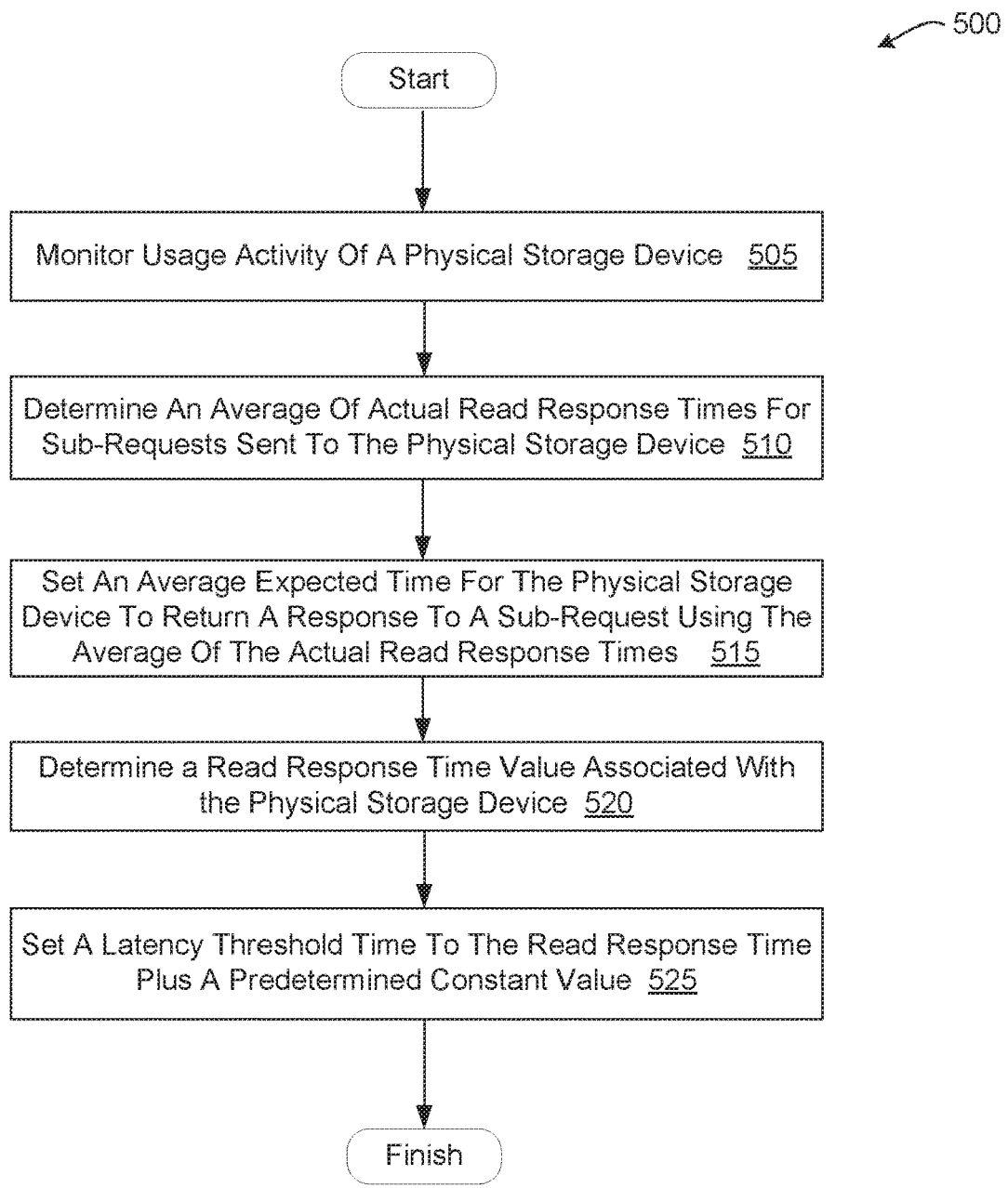
FIG. 5 is a flow diagram of one embodiment for a method of determining a latency threshold time based on read response time of a physical storage device.

FIG. 5 is a flow diagram of one embodiment for a method 500 of determining a latency threshold time based on read response time of a physical storage device. Method 500 may be performed, for example, by a latency manager of I/O controller. At block 505 of method 500, processing logic monitors usage activity of a physical storage device. At block 510, processing logic determines an average of actual read response times for sub-requests sent to the physical storage device. At block 515, processing logic sets an average expected time for the physical storage device to return a response to a sub-request using the average of the read response times. At block 520, processing logic determines a read response time value associated with the physical storage device. In some implementations, the read response time value may be set to the average expected time for the physical storage device to return a response calculated at block 515. At block 525, processing logic sets the latency threshold time to the read response time value plus a predetermined constant value. After block 525, the method of FIG. 5 terminates.

Figure 6A:
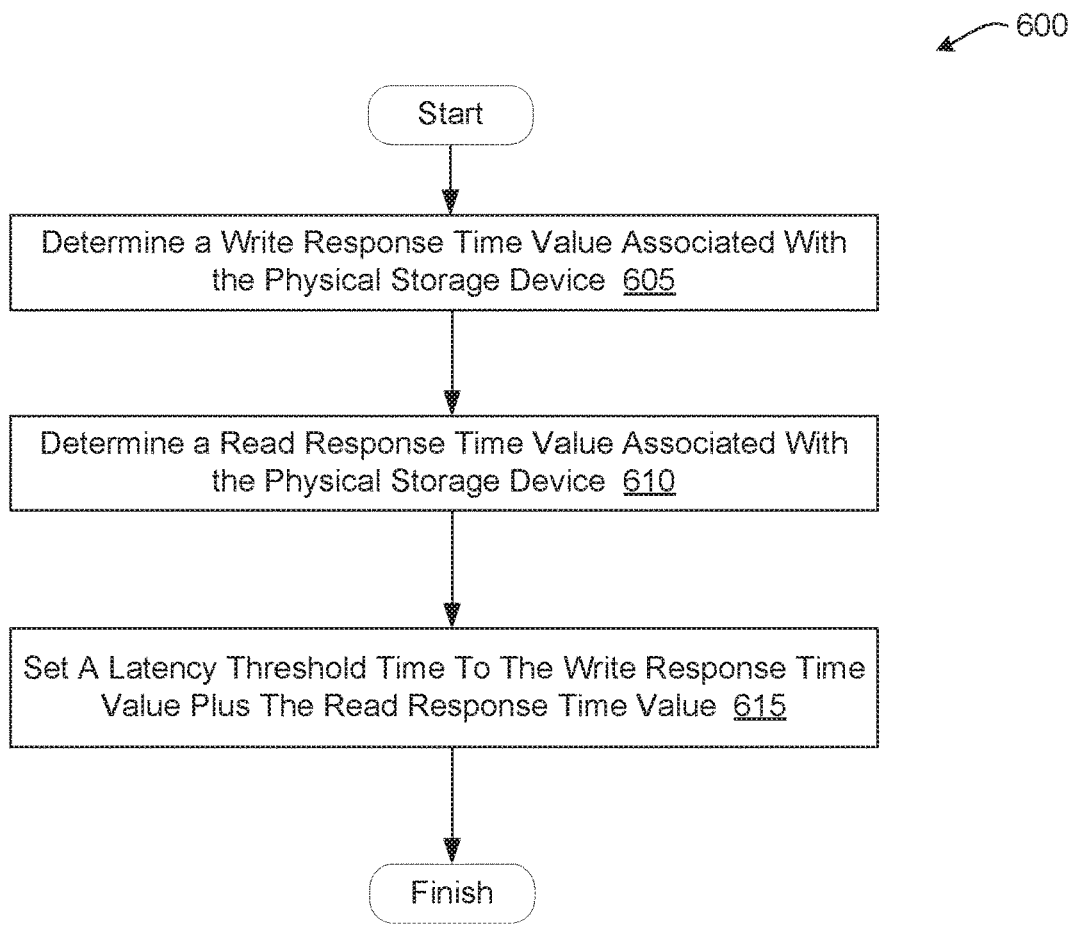
FIG. 6A is a flow diagram of one embodiment for a method of determining a latency threshold time based on write response time of a physical storage device.

FIG. 6A is a flow diagram of one embodiment for a method 600 of determining a latency threshold time based on write response time of a physical storage device. Method 600 may be performed, for example, by a latency manager of an I/O controller. At block 605 of method 600, processing logic determines a write response time value associated with a physical storage device. In some implementations, the write response time value may be set to the average expected time for the physical storage device to complete a write operation. At block 610, processing logic determines a read response time value associated with the physical storage device. In some implementations, the read response time value may be set as described above with respect to FIG. 5. At block 615, processing logic sets the latency threshold time to the write response time value plus the read response time value. After block 615, the method of FIG. 6A terminates.

Figure 6B:
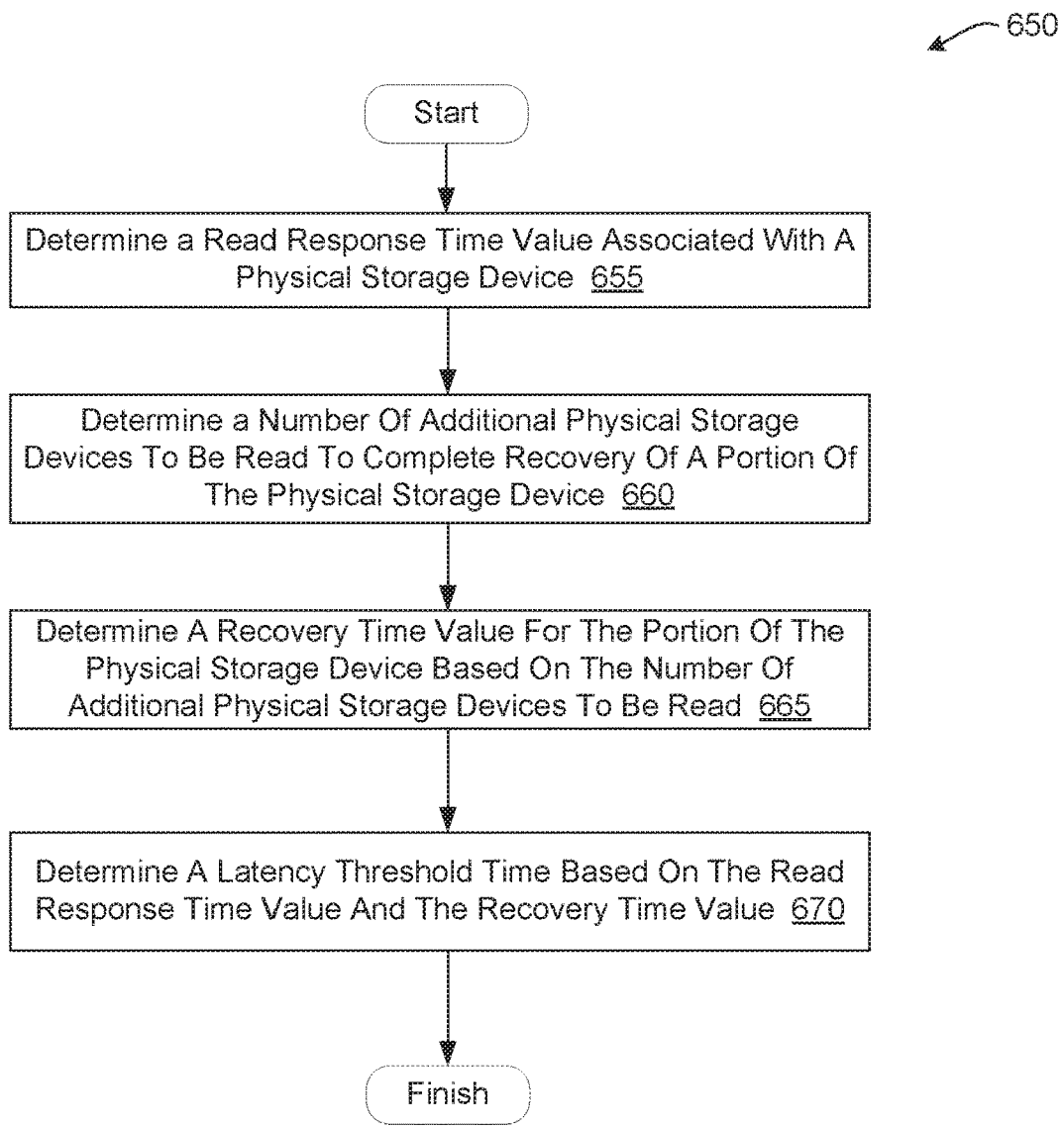
FIG. 6B is a flow diagram of one embodiment for a method of determining a latency threshold time based on recovery time for a portion of a physical storage device.

FIG. 6B is a flow diagram of one embodiment for a method 650 of determining a latency threshold time based on recovery time for a portion of a physical storage device. Method 650 may be performed, for example, by a latency manager of an I/O controller. At block 655 of method 650, processing logic determines a read response time value associated with a physical storage device. In some implementations, the read response time value may be set as described above with respect to FIG. 5.

At block 660, processing logic determines a number of additional physical storage devices to be read to complete recovery of a portion of the physical storage device. In some implementations, the number of additional physical storage devices may be a number of SSDs in a storage array that will be used for recovery. For example, in a storage array of 16 SSDs that includes a single SSD that stores parity information, the number of additional physical storage devices may be 16 (16 total SSDs, minus the SSD to be recovered, plus the parity drive). Similarly, for a storage array of 4 drives that includes a single SSD that stores parity information, the number of additional physical storage devices may be 4 (4 total SSDs, minus the SSD to be recovered, plus the parity drive).

At block 665, processing logic determines a recovery time value for the portion of the physical storage device based on the number of additional physical storage devices to be read. For example, a 16 drive array that uses 15 of the drives for recovery with one parity drive may yield a larger recovery time value (e.g., to account for the larger number of drives to be read and/or that larger amount of data that will be used to recompute the data from the failed SSD) than the 4 drive array that uses 3 of the drives for recovery with one parity drive. At block 670, processing logic determines the latency threshold time based on the read response time value and the recovery time value. For example, processing logic may add the read response time value to the recovery time value to determine the latency threshold. After block 670, the method of FIG. 6B terminates.

Figure 7:
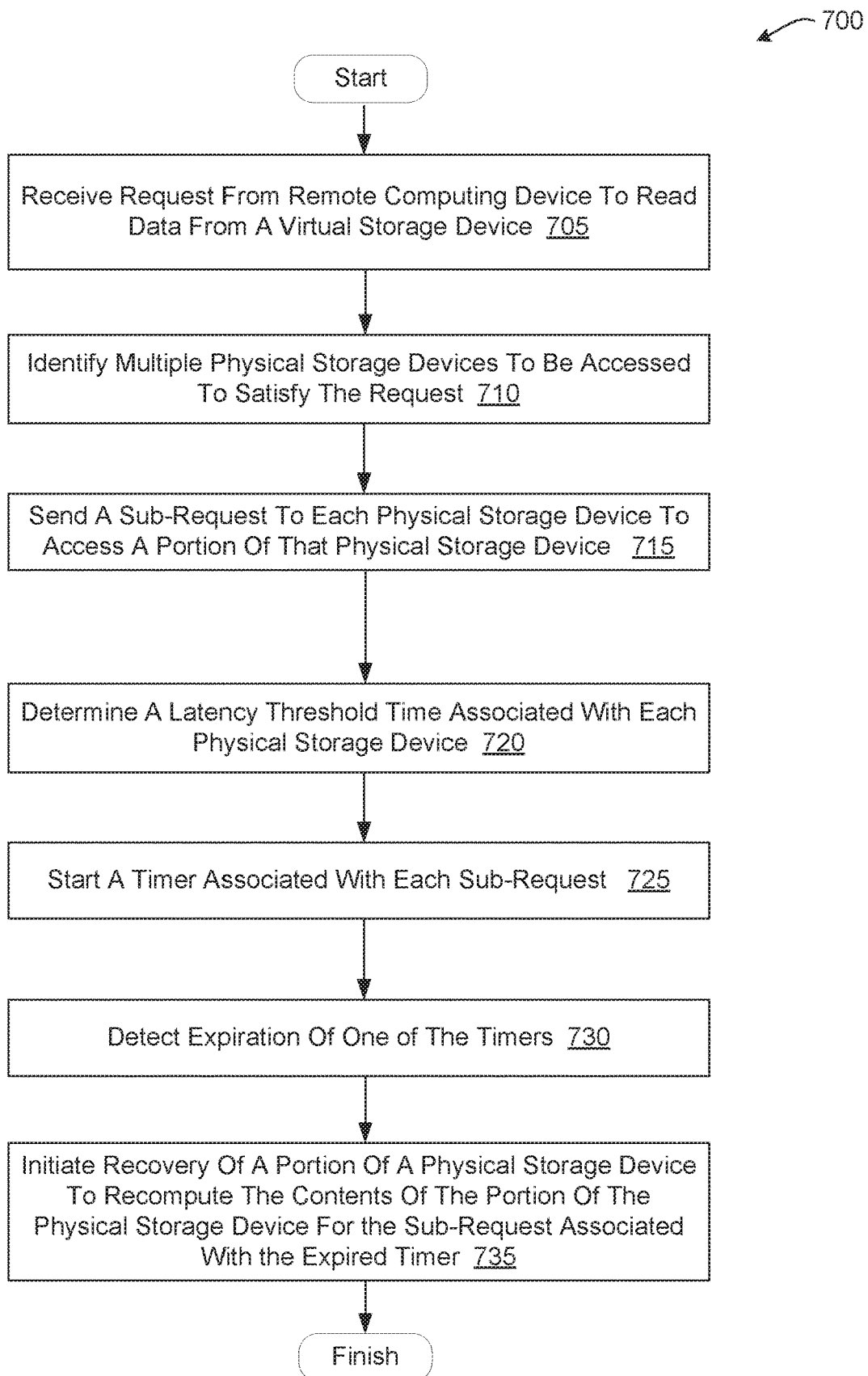
FIG. 7 is a flow diagram of one embodiment for a method of providing consistent latency for multiple sub-requests sent to Solid State Drives.

FIG. 7 is a flow diagram of one embodiment for a method 700 of providing consistent latency for multiple sub-requests sent to Solid State Drives. Method 700 may be performed, for example, by a latency manager of an I/O controller. At block 705 of method 700, processing logic receives a request from a remote computing device to read data from a virtual storage device (e.g., from a virtual drive mounted on the host). At block 710, processing identifies multiple physical storage devices to be accessed to satisfy the request received at block 705. At block 715, processing logic sends a sub-request to each physical storage device to access a portion of that physical storage device.

At block 720, processing logic determines a latency threshold time associated with each physical storage device. At block 725, processing logic starts a timer associated with each sub-request. At block 725, processing logic detects expiration of one of the timers. At block 730, processing logic initiates recovery of a portion of a physical storage device to recompute the contents of that portion of the physical storage device for the sub-request associated with the expired timer. After block 730, the method of FIG. 7 terminates.

Figure 8:
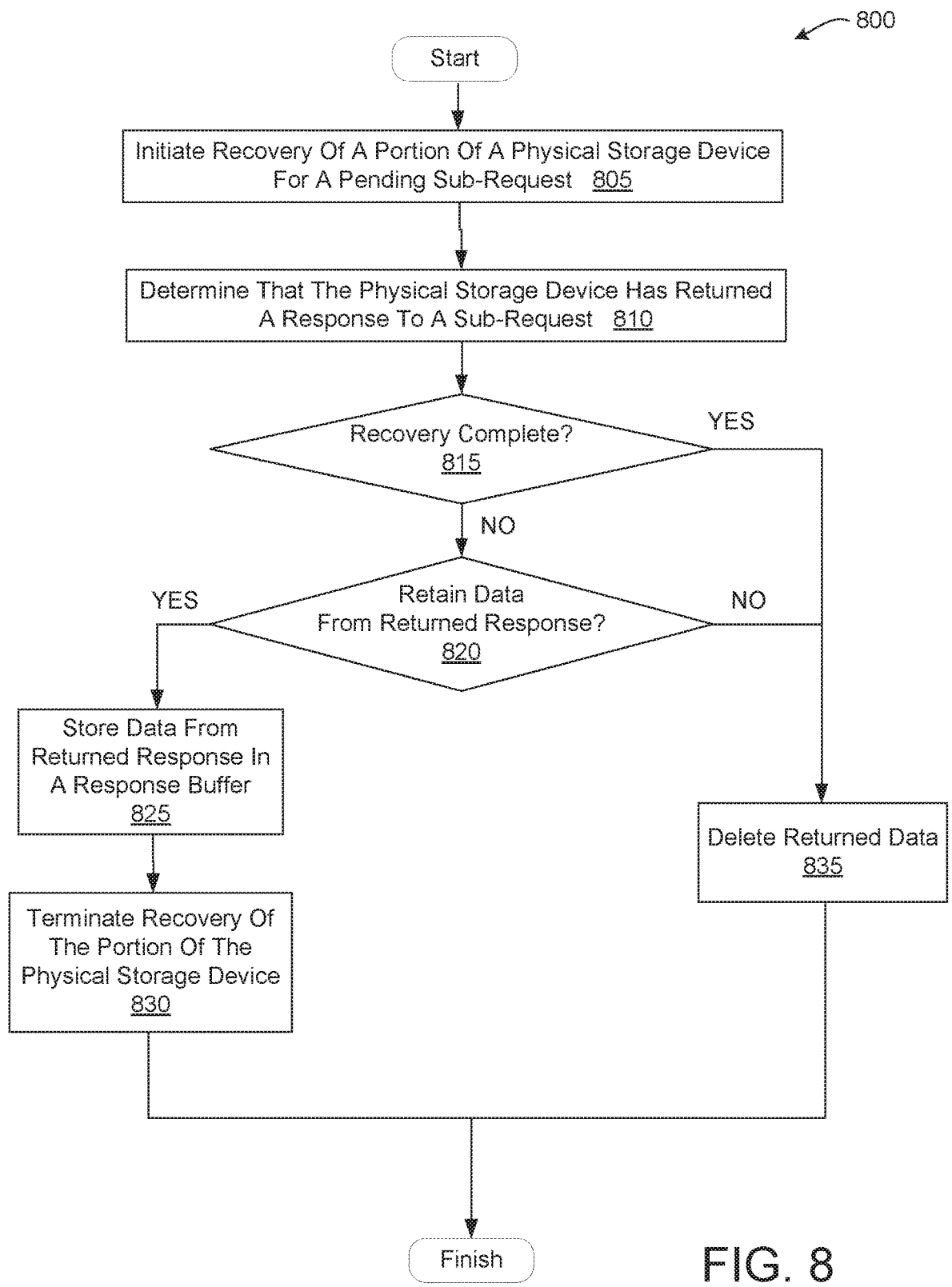
FIG. 8 is a flow diagram of one embodiment for a method of handling a response to a sub-request when recovery has been initiated but not completed.

FIG. 8 is a flow diagram of one embodiment for a method 800 of handling a response to a sub-request when recovery has been initiated but not completed. Method 800 may be performed, for example, by a latency manager of an I/O controller. At block 805 of method 700, processing logic initiates recovery of a portion of a physical storage device for a pending sub-request. At block 810, processing logic determines that the physical storage device has returned a response to the sub-request.

At block 815, processing logic determines whether the recovery process initiated at block 805 has completed. If so, processing proceeds to block 835 where the data returned by the response to the sub-request is deleted (e.g., not written to the response buffer). Otherwise, processing continues to block 820. At block 820, processing logic determines whether to retain the data from the returned response rather than the recomputed data generated by the recovery process. If not, processing proceeds to block 835. Otherwise, processing continues to block 825. At block 825, processing logic stores the data from the returned response to the sub-request in a response buffer to be used to return a response to a remote computing device. At block 830, processing logic terminates recovery of the portion of the physical storage device initiated at block 805. After either block 830 or block 835, the method of FIG. 8 terminates.

Figure 9:
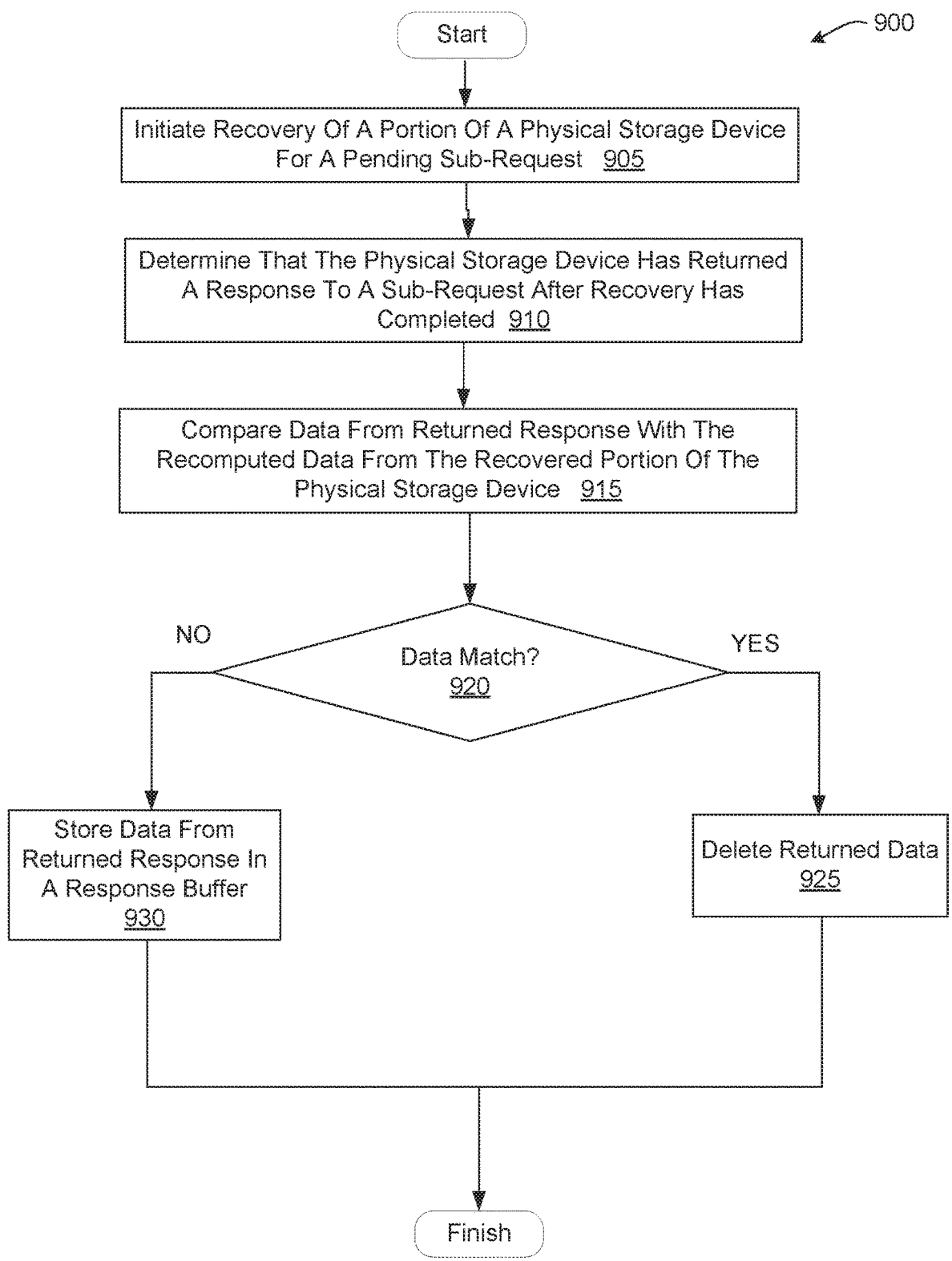
FIG. 9 is a flow diagram of one embodiment for a method of handling a response to a sub-request when recovery has been completed.

FIG. 9 is a flow diagram of one embodiment for a method 900 of handling a response to a sub-request when recovery has been completed. Method 900 may be performed, for example, by a latency manager of an I/O controller. At block 905 of method 900, processing logic initiates recovery of a portion of a physical storage device for a pending sub-request. At block 910, processing logic determines that the physical storage device has returned a response to the sub-request after recovery has completed. At block 915, processing logic compares the data from the returned response to the sub-request with the recomputed data from the recovered portion of the physical storage device. At block 920, processing logic branches based whether the data compared at block 915 matches. If so, processing continues to block 925. Otherwise processing proceeds to block 930. At block 925, processing logic deletes the data returned in the response to the sub-request (e.g., does not store the returned data to a response buffer). At block 930, processing logic stores the data returned in the response to the sub-request in a response buffer (e.g., replaces the recovered data with the data returned in the response). After either block 925 or block 930, the method of FIG. 9 terminates.

Figure 10:
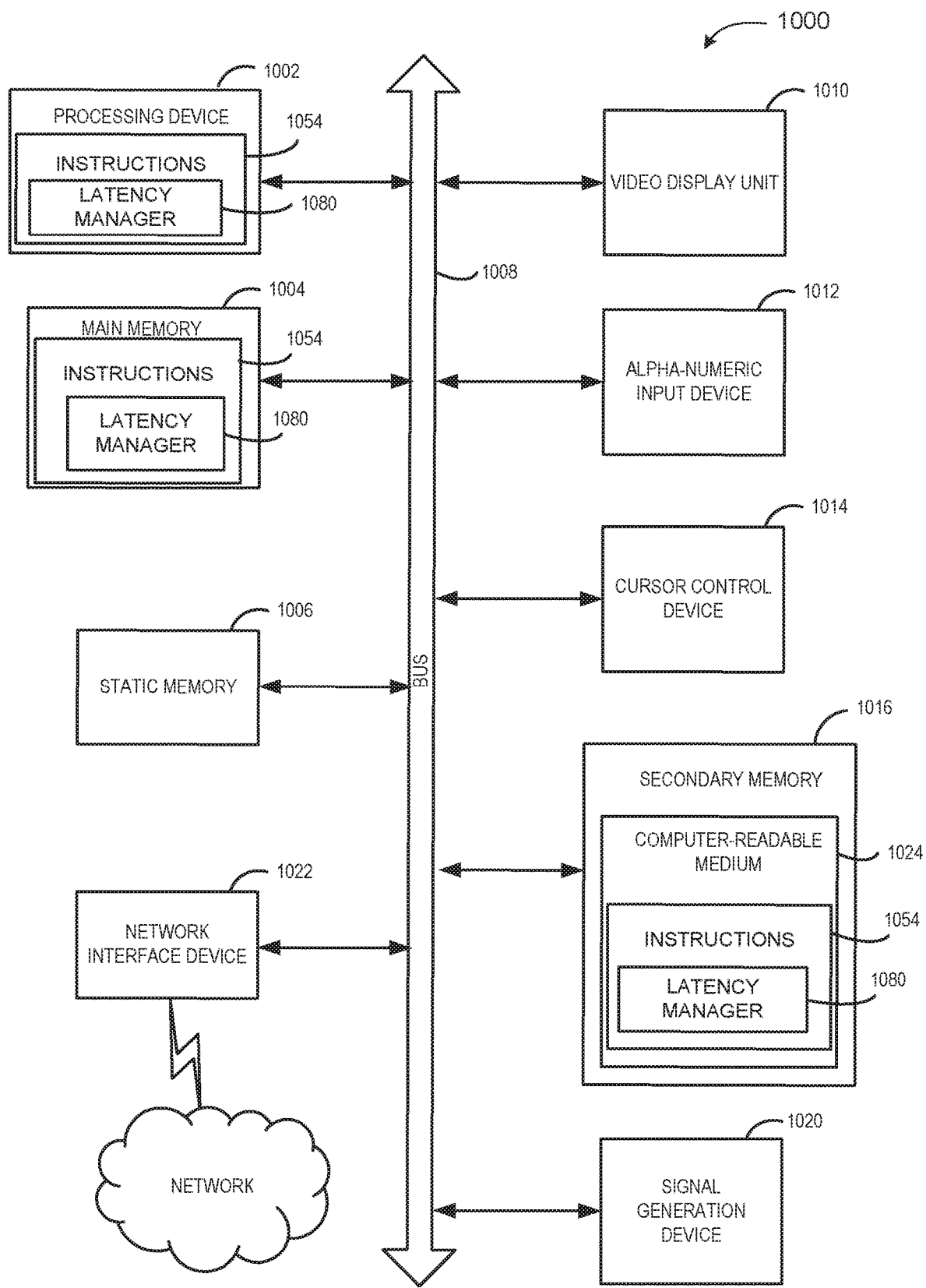
FIG. 10 illustrates an example computing device, in accordance with one embodiment.

FIG. 10 illustrates a diagrammatic representation of a machine in the example form of a computing device 1000 within which a set of instructions, for causing the machine to perform any one or more of the methodologies discussed herein, may be executed. In alternative embodiments, the machine may be connected (e.g., networked) to other machines in a Local Area Network (LAN), an intranet, an extranet, or the Internet. The machine may operate in the capacity of a server or a client machine in a client-server network environment, or as a peer machine in a peer-to-peer (or distributed) network environment. The machine may be a personal computer (PC), a tablet computer, a set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines (e.g., computers) that individually or jointly execute a set (or multiple sets) of instructions to perform any one or more of the methodologies discussed herein.

The example computing device 1000 includes a processing device 1002, a main memory 1004 (e.g., read-only memory (ROM), flash memory, dynamic random access memory (DRAM) such as synchronous DRAM (SDRAM) or Rambus DRAM (RDRAM), etc.), a static memory 1006 (e.g., flash memory, static random access memory (SRAM), etc.), and a secondary memory 1016 (e.g., a data storage device), which communicate with each other via a bus 1008.

Processing device 1002 represents one or more general-purpose processors such as a microprocessor, central processing unit, or the like. More particularly, the processing device 1002 may be a complex instruction set computing (CISC) microprocessor, reduced instruction set computing (RISC) microprocessor, very long instruction word (VLIW) microprocessor, processor implementing other instruction sets, or processors implementing a combination of instruction sets. Processing device 1002 may also be one or more special-purpose processing devices such as an application specific integrated circuit (ASIC), a field programmable gate array (FPGA), a digital signal processor (DSP), network processor, or the like. Processing device 1002 is configured to execute processing logic (e.g., instructions 1054) for performing operations discussed herein.

The computing device 1000 may further include a network interface device 1022. The computing device 1000 also may include a video display unit 1010 (e.g., a liquid crystal display (LCD) or a cathode ray tube CRT)), an alphanumeric input device 1012 (e.g., a keyboard), a cursor control device 1014 (e.g., a mouse), and a signal generation device 1020 (e.g., a speaker).

The secondary memory 1006 may include a machine-readable storage medium (or more specifically a computer-readable storage medium) 1024 on which is stored one or more sets of instructions 1054 embodying any one or more of the methodologies or functions described herein. The instructions 1054 may also reside, completely or at least partially, within the main memory 1004 and/or within the processing device 1002 during execution thereof by the computing device 1000, the main memory 1004 and the processing device 1002 also constituting computer-readable storage media.

The computer-readable storage medium 1024 may also be used to store a latency manager 1080 (as described above with respect to FIGS. 2B and FIGS. 3-9), and/or a software library containing methods that call a latency manager 1080. While the computer-readable storage medium 1054 is shown in an example embodiment to be a single medium, the term "computer-readable storage medium" should be taken to include a single medium or multiple media (e.g., a centralized or distributed database, and/or associated caches and servers) that store the one or more sets of instructions. The term "computer-readable storage medium" shall also be taken to include any non-transitory medium that is capable of storing or encoding a set of instructions for execution by the machine and that cause the machine to perform any one or more of the methodologies described herein. The term "computer-readable storage medium" shall accordingly be taken to include, but not be limited to, solid-state memories, and optical and magnetic media.

The modules, components and other features described herein (for example in relation to FIGS. 2A-2B) can be implemented as discrete hardware components or integrated in the functionality of hardware components such as ASICS, FPGAs, DSPs, SoCs or similar devices. In addition, the modules can be implemented as firmware or functional circuitry within hardware devices. Further, the modules can be implemented in any combination of hardware devices and software components, or only in software.

Some portions of the detailed description are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "receiving", "identifying", "sending", "initiating", "returning", "starting", "setting", or the like, refer to the actions and processes of a processing device or processing logic that manipulates and transforms data represented as physical (e.g., electronic) quantities within registers and memories into other data similarly represented as physical quantities within the memories or registers or other such information storage devices.

Embodiments of the invention also relate to an apparatus for performing the operations herein. This apparatus may be specially constructed for the required purposes, or it may comprise a general purpose computer selectively activated or reconfigured by a computer program or firmware stored in the computer. Such a computer program or firmware may be stored in a computer readable storage medium, such as, but not limited to, any type of disk including optical disks, CD-ROMs, and magnetic-optical disks, read-only memories (ROMs), random access memories (RAMs), electrically programmable read only memories (EPROMs), electrically erasable programmable read only memories (EEPROMs), magnetic or optical cards, or any type of media suitable for storing electronic instructions. The term "computer-readable storage medium" shall also be taken to include any medium other than a carrier wave that is capable of storing or encoding a set of instructions for execution by the computing device that cause the computing device to perform any one or more of the methodologies of the present invention.

It is to be understood that the above description is intended to be illustrative, and not restrictive. Many other embodiments will be apparent those of skill in the art upon reading and understanding the above description. The scope of the invention should, therefore, be determined with reference to the appended claims, along with the full scope of equivalents to which such claims are entitled.

What is claimed is:

1. A method comprising:
   receiving, by a processing device, a request from a remote computing device to read data from a virtual storage device;
   identifying, by the processing device, a physical storage device to be accessed to satisfy the request;
   sending, by the processing device, a sub-request to the physical storage device to access a portion of the physical storage device;
   determining a latency threshold time associated with the physical storage device such that a first latency comprising the latency threshold time plus a time to perform recovery of the portion of the physical storage device is less than a second latency, wherein the second latency is an amount of time it takes to complete garbage collection operations on the portion of the physical storage device;
   starting a timer associated with the sub-request, wherein determining that the physical storage device has not returned a response to the sub-request within the latency threshold time comprises detecting an expiration of the timer;
   responsive to determining that the physical storage device has not returned the response to the sub-request within the latency threshold time, initiating, by the processing device, the recovery of the portion of the physical storage device to recompute contents of the portion of the physical storage device; and
   returning, by the processing device, a response to the request from the remote computing device with the first latency that is less than the second latency, wherein the response comprises the recomputed contents of the portion of the physical storage device.

2. The method of claim 1, wherein the response comprises a first data portion and a second data portion, and wherein the first data portion comprises the recomputed contents of the portion of the physical storage device, and wherein the second data portion comprises additional data accessed from an additional storage device without recomputing contents of the additional storage device.

3. The method of claim 1, wherein determining the latency threshold time comprises:
   determining a read response time value associated with the physical storage device, wherein the read response time value comprises an average expected time for the physical storage device to return the response to the sub-request; and
   setting the latency threshold time to the read response time value plus a predetermined constant value.

4. The method of claim 3, wherein determining the average expected time for the physical storage device to return the response to the sub-request comprises:
   monitoring usage activity of the physical storage device, wherein the usage activity comprises actual read response times for a plurality of other sub-requests sent to the physical storage device to perform read operations;
   determining an average of the actual read response times for the plurality of other sub-requests; and
   setting the average expected time for the physical storage device to return the response to the sub-request using the average of the actual read response times.

5. The method of claim 1, wherein determining the latency threshold time comprises:
   determining a write response time value associated with the physical storage device, wherein the write response time value comprises an average expected time for the physical storage device to complete a write operation;
   determining a read response time value associated with the physical storage device, wherein the read response time value comprises an average expected time for the physical storage device to return the response to the sub-request; and
   setting the latency threshold time to the write response time value plus the read response time value.

6. The method of claim 5, wherein determining the average expected time for the physical storage device to complete the write operation comprises:
   accessing a mapping table that stores configuration information corresponding to the physical storage device; and
   setting the average expected time for the physical storage device to complete the write operation using the configuration information from the mapping table.

7. The method of claim 1, further comprising:
   identifying one or more additional physical storage devices to be accessed to satisfy the request from the remote computing device;
   determining additional latency threshold times associated with each of the additional physical storage devices;
   sending, to each additional physical storage device of the one or more additional physical storage devices, an additional sub-request to access a portion of that additional physical storage device; and
   starting an additional timer for each of the additional sub-requests.

8. The method of claim 7, further comprising:
   responsive to detecting expiration of one of the additional timers, initiating recovery of the portion of a corresponding one of the additional physical storage devices to recompute contents of the respective portion,
   wherein the response to the request from the remote computing device further comprises the recomputed contents from the respective portion.

9. The method of claim 1, further comprising:
   responsive to determining that the physical storage device has returned the response to the sub-request after recovery of the portion of the physical storage device has been initiated:
      storing data from the returned response to the sub-request in a response buffer to be used to return the response to the request from the remote computing device; and
      terminating the recovery of the portion of the physical storage device.

10. The method of claim 1, further comprising:
    responsive to determining that the physical storage device has returned the response to the sub-request after recovery of the portion of the physical storage device has been initiated, deleting data from the returned response to the sub-request.

11. The method of claim 1, further comprising:
    responsive to determining that the physical storage device has returned the response to the sub-request after recovery of the portion of the physical storage device has been completed:
       comparing data from the returned response to the sub-request to the recomputed contents of the portion of the physical storage device to determine whether the data matches the recomputed contents of the portion of the physical storage device; and
       responsive to determining that the data does not match the recomputed contents of the portion of the physical storage device, storing the data in a response buffer to be used to return the response to the request from the remote computing device.

12. The method of claim 1, further comprising:
    responsive to determining that the physical storage device has returned the response to the sub-request after recovery of the portion of the physical storage device has been completed:
       comparing data from the response to the sub-request to the recomputed contents of the portion of the physical storage device to determine whether the data matches the recomputed contents of the portion of the physical storage device;
       responsive to determining that the data does not match the recomputed contents of the portion of the physical storage device, storing the data in a response buffer to be used to return the response to the request from the remote computing device; and
       responsive to determining that the data matches the recomputed contents of the portion of the physical storage device, deleting the data from the returned response to the sub-request.

13. The method of claim 1, further comprising:
    responsive to determining that the physical storage device has returned the response to the sub-request after recovery of the portion of the physical storage device has been completed, deleting data from the returned response to the sub-request.

14. The method of claim 1, wherein determining the latency threshold time comprises:

determining a read response time value associated with the physical storage device, wherein the read response time value comprises an average expected time for the physical storage device to return the response to the sub-request;

determining a number of additional physical storage devices to be read to complete recovery of a portion of the physical storage device;

determining a recovery time value for the portion of the physical storage device based on the number of additional physical storage devices to be read; and determining the latency threshold time based on a combination of the read response time value and the recovery time value.

15. A system comprising:

one or more physical storage devices; and an I/O controller coupled to the one or more physical storage devices via at least one of a switch or a bus, the I/O controller comprising a processing device that is to:

receive a request from a remote computing device to read data from a virtual storage device;

identify a physical storage device of the one or more physical storage devices to be accessed to satisfy the request;

send a sub-request to the physical storage device to access a portion of the physical storage device;

determine a latency threshold time associated with the physical storage device such that a first latency comprising the latency threshold time plus a time to perform recovery of the portion of the physical storage device is less than a second latency, wherein the second latency is an amount of time it takes to complete garbage collection operations on the portion of the physical storage device;

start a timer associated with the sub-request, wherein determining that the physical storage device has not returned a response to the sub-request within the latency threshold time comprises detecting an expiration of the timer;

responsive to determining that the physical storage device has not returned the response to the sub-request within the latency threshold time, initiate the recovery of the portion of the physical storage device to recompute contents of the portion of the physical storage device; and return a response to the request from the remote computing device with the first latency that is less than the second latency, wherein the response comprises the recomputed contents of the portion of the physical storage device.

16. The system of claim 15, wherein to determine the latency threshold time, the processing device is further to:

determine a read response time value associated with the physical storage device, wherein the read response time value comprises an average expected time for the physical storage device to return the response to the sub-request; and set the latency threshold time to the read response time value plus a predetermined constant value.

17. The system of claim 15, wherein to determine an average expected time for the physical storage device to return the response to the sub-request, the processing device is further to:

monitor usage activity of the physical storage device, wherein the usage activity comprises actual read response times for a plurality of other sub-requests sent to the physical storage device to perform read operations;

determine an average of the actual read response times for the plurality of other sub-requests; and set the average expected time for the physical storage device to return the response to the sub-request using the average of the actual read response times.

18. A non-transitory computer readable storage medium having instructions that, when executed by a processing device, cause the processing device to perform operations comprising:

receiving, by the processing device, a request from a remote computing device to read data from a virtual storage device;

identifying, by the processing device, a physical storage device to be accessed to satisfy the request;

sending, by the processing device, a sub-request to the physical storage device to access a portion of the physical storage device;

determining a latency threshold time associated with the physical storage device such that a first latency comprising the latency threshold time plus a time to perform recovery of the portion of the physical storage device is less than a second latency, wherein the second latency is an amount of time it takes to complete garbage collection operations on the portion of the physical storage device;

starting a timer associated with the sub-request, wherein determining that the physical storage device has not returned a response to the sub-request within the latency threshold time comprises detecting an expiration of the timer;

responsive to determining that the physical storage device has not returned the response to the sub-request within the latency threshold time, initiating, by the processing device, the recovery of the portion of the physical storage device to recompute contents of the portion of the physical storage device; and returning, by the processing device, a response to the request from the remote computing device with the first latency that is less than the second latency, wherein the response comprises the recomputed contents of the portion of the physical storage device.

* * * * *